United States Patent
Li et al.

(10) Patent No.: US 12,003,439 B2
(45) Date of Patent: *Jun. 4, 2024

(54) METHODS AND APPARATUS FOR MULTI-CARRIER COMMUNICATION SYSTEMS WITH ADAPTIVE TRANSMISSION AND FEEDBACK

(71) Applicant: Neo Wireless LLC, Wayne, PA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neo Wireless LLC, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,878

(22) Filed: Jun. 3, 2022

(65) Prior Publication Data
US 2022/0303971 A1 Sep. 22, 2022

Related U.S. Application Data

(63) Continuation of application No. 17/727,389, filed on Apr. 22, 2022, which is a continuation of application
(Continued)

(51) Int. Cl.
*H04W 72/04* (2009.01)
*H04B 7/0413* (2017.01)
(Continued)

(52) U.S. Cl.
CPC ......... *H04L 5/0044* (2013.01); *H04B 7/0413* (2013.01); *H04L 1/0026* (2013.01);
(Continued)

(58) Field of Classification Search
CPC ............ H04W 72/0406; H04B 7/0413; H04L 1/0026; H04L 1/0029; H04L 1/0068; H04L 1/0073; H04L 5/0007; H04L 5/0044
See application file for complete search history.

(56) References Cited

U.S. PATENT DOCUMENTS

| | | |
|---|---|---|
| 5,825,807 A | 10/1998 | Kumar |
| 5,828,695 A | 10/1998 | Webb |

(Continued)

FOREIGN PATENT DOCUMENTS

| | | |
|---|---|---|
| KR | 20010083789 | 9/2001 |
| KR | 20030085074 | 11/2003 |

(Continued)

OTHER PUBLICATIONS

Aldinger, "Multicarrier COFDM Scheme in High Bitrate Radio Local Area Networks," 5th IEEE International Symposium on Personal, Indoor, and Mobile Radio Communications, Wireless Networks—Catching the Mobile Future, vol. 3, pp. 969-973 (1994).
(Continued)

*Primary Examiner* — John D Blanton
(74) *Attorney, Agent, or Firm* — Volpe Koenig

(57) ABSTRACT

An arrangement is disclosed where in a multi-carrier communication system, the modulation scheme, coding attributes, training pilots, and signal power may be adjusted to adapt to channel conditions in order to maximize the overall system capacity and spectral efficiency without wasting radio resources or compromising error probability performance, etc.

30 Claims, 8 Drawing Sheets

Related U.S. Application Data

No. 17/341,871, filed on Jun. 8, 2021, which is a continuation of application No. 17/094,286, filed on Nov. 10, 2020, now Pat. No. 11,032,801, which is a continuation of application No. 16/126,896, filed on Sep. 10, 2018, now Pat. No. 10,834,706, which is a continuation of application No. 15/082,878, filed on Mar. 28, 2016, now Pat. No. 10,075,941, which is a continuation of application No. 14/539,917, filed on Nov. 12, 2014, now Pat. No. 9,301,296, which is a continuation of application No. 13/246,677, filed on Sep. 27, 2011, now abandoned, which is a continuation of application No. 12/755,313, filed on Apr. 6, 2010, now Pat. No. 8,027,367, which is a continuation of application No. 10/583,529, filed as application No. PCT/US2005/004601 on Feb. 14, 2005, now Pat. No. 7,693,032.

(60) Provisional application No. 60/544,521, filed on Feb. 13, 2004.

(51) Int. Cl.
*H04L 1/00* (2006.01)
*H04L 5/00* (2006.01)
*H04W 72/044* (2023.01)
*H04W 72/20* (2023.01)
*H04W 52/26* (2009.01)

(52) U.S. Cl.
CPC .......... *H04L 1/0029* (2013.01); *H04L 1/0068* (2013.01); *H04L 1/0073* (2013.01); *H04L 5/0007* (2013.01); *H04L 5/0046* (2013.01); *H04L 5/0048* (2013.01); *H04L 5/006* (2013.01); *H04W 72/044* (2013.01); *H04W 72/20* (2023.01); *H04L 1/0003* (2013.01); *H04L 1/0009* (2013.01); *H04L 5/0091* (2013.01); *H04W 52/26* (2013.01)

(56) References Cited

U.S. PATENT DOCUMENTS

| | | |
|---|---|---|
| 5,867,478 A | 2/1999 | Baum et al. |
| 5,898,338 A | 4/1999 | Proctor et al. |
| 5,929,704 A | 7/1999 | Proctor, Jr. et al. |
| 6,014,550 A | 1/2000 | Rikkinen |
| 6,078,216 A | 6/2000 | Proctor, Jr. |
| 6,400,699 B1 | 6/2002 | Airy et al. |
| 6,400,783 B1 | 6/2002 | Cusani |
| 6,480,558 B1 | 11/2002 | Ottosson et al. |
| 6,515,960 B1 | 2/2003 | Usui et al. |
| 6,567,383 B1 | 5/2003 | Bohnke |
| 6,643,281 B1 | 11/2003 | Ryan |
| 6,654,429 B1 | 11/2003 | Li |
| 6,731,673 B1 | 5/2004 | Kotov et al. |
| 6,741,578 B1 | 5/2004 | Moon et al. |
| 6,791,960 B1 | 9/2004 | Song |
| 6,847,678 B2 | 1/2005 | Berezdivin et al. |
| 6,904,550 B2 | 6/2005 | Sibecas et al. |
| 6,909,761 B2 | 6/2005 | Kloos et al. |
| 6,922,388 B1 | 7/2005 | Laroia et al. |
| 6,937,592 B1 | 8/2005 | Heath, Jr. et al. |
| 6,937,642 B2 | 8/2005 | Hirata |
| 6,940,827 B2 | 9/2005 | Li et al. |
| 6,947,748 B2 | 9/2005 | Li et al. |
| 6,973,502 B2 | 12/2005 | Patil |
| 7,020,072 B1 | 3/2006 | Li et al. |
| 7,027,464 B1 | 4/2006 | Nakahara et al. |
| 7,035,663 B1 | 4/2006 | Linebarger et al. |
| 7,039,001 B2 | 5/2006 | Krishnan et al. |
| 7,039,003 B2 | 5/2006 | Hayashi et al. |
| 7,062,002 B1 | 6/2006 | Michel et al. |
| 7,103,325 B1 | 9/2006 | Jia et al. |
| 7,110,783 B2 | 9/2006 | Bahl et al. |
| 7,123,934 B1 | 10/2006 | Linebarger et al. |
| 7,161,985 B2 | 1/2007 | Dostert et al. |
| 7,173,991 B2 | 2/2007 | Scarpa |
| 7,209,459 B2 | 4/2007 | Kangas |
| 7,248,559 B2 | 7/2007 | Ma et al. |
| 7,257,423 B2 | 8/2007 | Iochi |
| 7,260,054 B2 | 8/2007 | Olszewski |
| 7,289,494 B2 | 10/2007 | Lakkis |
| 7,304,939 B2 | 12/2007 | Steer et al. |
| 7,317,702 B2 | 1/2008 | Dominique et al. |
| 7,333,457 B2 | 2/2008 | Gopalakrishnan et al. |
| 7,376,193 B2 | 5/2008 | Lee et al. |
| 7,386,055 B2 | 6/2008 | Morita et al. |
| 7,388,847 B2 | 6/2008 | Dubuc et al. |
| 7,403,513 B2 | 7/2008 | Lee et al. |
| 7,403,556 B2 | 7/2008 | Kao et al. |
| 7,418,042 B2 | 8/2008 | Choi et al. |
| 7,436,757 B1 | 10/2008 | Wilson et al. |
| 7,437,166 B2 | 10/2008 | Osseiran et al. |
| 7,443,829 B2 | 10/2008 | Rizvi et al. |
| 7,492,722 B2 | 2/2009 | Pietraski et al. |
| 7,522,514 B2 | 4/2009 | Tzannes et al. |
| 7,555,268 B2 | 6/2009 | Trachewsky et al. |
| 7,567,624 B1 | 7/2009 | Schmidl et al. |
| 7,577,100 B2 * | 8/2009 | Pollmann ................ H04L 1/20 370/465 |
| 7,619,963 B2 * | 11/2009 | Abe ...................... H04L 5/0048 370/480 |
| 7,630,339 B2 | 12/2009 | Laroia et al. |
| 7,630,356 B2 | 12/2009 | Zhang et al. |
| 7,646,747 B2 | 1/2010 | Atarashi et al. |
| 7,680,094 B2 | 3/2010 | Liu |
| 7,693,032 B2 | 4/2010 | Li et al. |
| 7,693,125 B2 | 4/2010 | Ihm et al. |
| 7,697,466 B2 | 4/2010 | Hashimoto et al. |
| 7,702,027 B2 | 4/2010 | Shirakata et al. |
| 7,724,720 B2 | 5/2010 | Korpela et al. |
| 7,738,437 B2 | 6/2010 | Ma et al. |
| 7,864,725 B2 | 1/2011 | Li et al. |
| 7,864,739 B2 | 1/2011 | Atarashi et al. |
| 7,904,093 B2 | 3/2011 | Nystrom et al. |
| 7,907,592 B2 | 3/2011 | Han et al. |
| 7,912,490 B2 | 3/2011 | Pietraski |
| 8,009,660 B2 | 8/2011 | Li et al. |
| 8,018,902 B2 | 9/2011 | Wintzell |
| 8,027,367 B2 | 9/2011 | Li et al. |
| 8,032,144 B2 | 10/2011 | Nishio |
| 8,094,611 B2 | 1/2012 | Li et al. |
| 8,179,833 B2 | 5/2012 | Attar et al. |
| 8,306,138 B2 * | 11/2012 | Imamura ............. H04L 25/0202 375/316 |
| 8,320,301 B2 | 11/2012 | Walton et al. |
| 8,428,009 B2 | 4/2013 | Li et al. |
| 8,724,555 B2 * | 5/2014 | Krishnan ............ H04W 74/004 370/208 |
| 9,301,296 B2 | 3/2016 | Li et al. |
| 9,473,269 B2 | 10/2016 | Walton et al. |
| 10,638,468 B2 | 4/2020 | Nelson et al. |
| 2002/0032030 A1 | 3/2002 | Berglund et al. |
| 2002/0093922 A1 * | 7/2002 | Grilli .................. H04W 52/228 370/335 |
| 2002/0147017 A1 | 10/2002 | Li et al. |
| 2002/0159422 A1 | 10/2002 | Li et al. |
| 2002/0159430 A1 | 10/2002 | Atarashi et al. |
| 2003/0081538 A1 | 5/2003 | Walton et al. |
| 2003/0103445 A1 | 6/2003 | Steer et al. |
| 2003/0108013 A1 | 6/2003 | Hwang et al. |
| 2003/0125040 A1 | 7/2003 | Walton et al. |
| 2003/0174643 A1 | 9/2003 | Ro et al. |
| 2003/0214927 A1 | 11/2003 | Atarashi et al. |
| 2004/0022176 A1 | 2/2004 | Hashimoto et al. |
| 2004/0047284 A1 | 3/2004 | Eidson |
| 2004/0128605 A1 | 7/2004 | Sibecas et al. |
| 2004/0142698 A1 | 7/2004 | Pietraski |
| 2004/0165683 A1 | 8/2004 | Gupta et al. |
| 2005/0002369 A1 | 1/2005 | Ro et al. |
| 2005/0003782 A1 | 1/2005 | Wintzell |

(56) References Cited

U.S. PATENT DOCUMENTS

| | | | |
|---|---|---|---|
| 2005/0025039 | A1 | 2/2005 | Hwang et al. |
| 2005/0041622 | A1* | 2/2005 | Dubuc ..................... H04L 1/20 370/332 |
| 2005/0111397 | A1 | 5/2005 | Attar et al. |
| 2005/0201326 | A1 | 9/2005 | Lakkis |
| 2005/0226182 | A1* | 10/2005 | Itoh ....................... H04W 52/48 370/332 |
| 2005/0239467 | A1* | 10/2005 | Nishio ................ H04W 52/286 455/442 |
| 2006/0015399 | A1 | 1/2006 | Alberth et al. |
| 2007/0026803 | A1 | 2/2007 | Malm |
| 2007/0053282 | A1 | 3/2007 | Tong et al. |
| 2007/0263735 | A1 | 11/2007 | Tong et al. |
| 2008/0165710 | A1* | 7/2008 | Parts ..................... H04L 5/0048 370/280 |
| 2011/0299474 | A1 | 12/2011 | Li et al. |

FOREIGN PATENT DOCUMENTS

| | | |
|---|---|---|
| KR | 20040055517 | 6/2004 |
| KR | 20060007481 | 1/2006 |
| WO | 2002/093819 | 11/2002 |

OTHER PUBLICATIONS

ANSI/IEEE Std 802.11, 1999 Edition (R2003), Information technology—Telecommunications and information exchange between systems—Local and metropolitan area networks—Specific requirements—Part 11: Wireless LAN Medium Access Control (MAC) and Physical Layer (PHY) Specifications (Reaffirmed Jun. 12, 2003).
Bingham, Theory and Practice of Modem Design, John Wiley and Sons, pp. 1-7, 108-110 (1988).
Chow et al., "A Multichannel Transceiver System for Asymmetric Digital Subscriber Line Service," IEEE Global Telecommunications Conference, GLOBECOM '91: Countdown to the New Millennium, Conference Record, pp. 1992-1996 (1991).
Cimini, "Analysis and Simulation of a Digital Mobile Channel Using Orthogonal Frequency Division Multiplexing," IEEE Transactions on Communications, vol. Com-33, No. 7, pp. 665-675 (Jul. 1985).
Eklund et al., "IEEE Standard 802.16: A Technical Overview of the WirelessMAN Air Interface for Broadband Wireless Access," IEEE Communications Magazine (Jun. 2002).
Eklund et al., WirelessMAN Inside the IEEE 802.16 Standard for Wireless Metropolitan Networks (2006).
Lawrey, "Multiuser OFDM," Fifth International Symposium on Signal Processing and its Applications, ISSPA '99, Brisbane, Australia (Aug. 22-25, 1999).
Le Floch et al., "Digital Sound Broadcasting to Mobile Receivers," IEEE Transactions on Consumer Electronics, vol. 35, No. 3, pp. 493-503 (1989).
Monsen, "Theoretical and Measured Performance of a DFE Modem on a Fading Multipath Channel," IEEE Transactions on Communications, vol. Com-25, No. 10, pp. 1144-1153 (Oct. 1977).
Neo Wireless LLC v. American Honda Motor Co., Inc. et al., and Neo Wireless LLC v. Nissan North America Inc. et al., Defendants Honda and Nissan's Motion to Dismiss Plaintiff's Claims of Willful and Induced Patent Infringement, Civil Action Nos. 2:22-cv-11403-TGB and Civil Action Nos. 2:22-cv-11405-TGB (Aug. 10, 2022).
Neo Wireless LLC v. American Honda Motor Co., Inc. et al., Defendants' Motion to Dismiss Plaintiff's Complaint, Civil Action No. 2:22-cv-01824-EAS-KAJ (Jun. 21, 2022).
Neo Wireless LLC v. American Honda Motor Co., Inc. et al., Plaintiff NEO Wireless, LLC's First Amended Complaint for Patent Infringement, Civil Action No. 2:22-cv-11403-TGB (Jul. 20, 2022).
Neo Wireless LLC V. FCA US, LLC, Plaintiff Neo Wireless LLC's Complaint for Patent Infringement, Civil Action No. 3:22-cv-01252 (Jul. 15, 2022).
Neo Wireless LLC v. Ford Motor Company, Ford Motor Company's Motion to Dismiss, Civil Action No. 4:22-va-00210-GAF (Jun. 21, 2022).
Neo Wireless LLC v. Ford Motor Company, Plaintiff NEO Wireless, LLC's First Amended Complaint for Patent Infringement, Civil Action No. 2:22-cv-11402-TGB (Jul. 20, 2022).
Neo Wireless LLC v. General Motors Company et al., Defendants General Motor Company and General Motors LLC's Answer to Complaint, Civil Action No. 2:22-cv-0094-JRG-RSP (Jun. 21, 2022).
Neo Wireless LLC v. General Motors Company et al., Plaintiff NEO Wireless, LLC's First Amended Complaint for Patent Infringement, Civil Action No. 2:22-cv-11407-TGB (Jul. 20, 2022).
Neo Wireless LLC V. Mercedes-Benz USA, LLC, Plaintiff Neo Wireless LLC's Complaint for Patent Infringement, Civil Action No. 3:22-cv-00780 (Jul. 15, 2022).
Neo Wireless LLC v. Nissan North America Inc. et al., Defendants' Motion to Dismiss the Complaint Pursuant to Rule 12(b)(6), Civil Action No. 3:22-cv-00220 (Jun. 21, 2022).
Neo Wireless LLC v. Nissan North America Inc. et al., Plaintiff NEO Wireless, LLC's First Amended Complaint for Patent Infringement, Civil Action No. 2:22-cv-11405-TGB (Jul. 20, 2022).
Neo Wireless LLC v. Tesla Inc., Defendant Tesla, Inc.'s Answer to Complaint, Civil Action No. 2-99-cv-0095-JRG-RSP (Jun. 21, 2022).
Neo Wireless LLC v. Tesla Inc., Plaintiff' NEO Wireless, LLC's First Amended Complaint for Patent Infringement, Civil Action No. 2:22-cv-11408-TGB (Jul. 20, 2022).
Neo Wireless LLC v. Toyota Motor Corporation et al., Plaintiff NEO Wireless, LLC's First Amended Complaint for Patent Infringement, Civil Action No. 2:22-cv-00093-JRG-RSP (Jun. 24, 2022).
Neo Wireless LLC v. Volkswagen Group of America, Inc. et al., Defendants Volkswagen Group of America, Inc. and Volkswagen Group of America Chattanooga Operations, LLC's Motion to Dismiss Pursuant to Federal Rule of Civil Procedure 12(b)(6), Civil Action No. 2:22-cv-11404-TGB (Aug. 10, 2022).
Neo Wireless LLC v. Volkswagen Group of America, Inc. et al., Plaintiff NEO Wireless, LLC's First Amended Complaint for Patent Infringement, Civil Action No. 2:22-cv-11404-TGB (Jul. 20, 2022).
Neo Wireless LLC, Claim Chart—Claim 13 of U.S. Pat. No. 10,075,941, submitted with Plaintiff's First Amended Complaint, Neo Wireless LLC v. American Honda Motor Co., Inc. et al., Civil Action No. 2:22-cv-11403-TGB (Jul. 20, 2022).
Neo Wireless LLC, Claim Chart—Claim 13 of U.S. Pat. No. 10,075,941, submitted with Plaintiff's First Amended Complaint, Neo Wireless LLC v. Volkswagen., Inc. et al., Civil Action No. 2:22-cv-11404-TGB (Jul. 20, 2022).
Neo Wireless LLC, Claim Chart—Claim 13 of U.S. Pat. No. 10,075,941, submitted with Plaintiff's First Amended Complaint, Neo Wireless LLC v. Nissan North America Inc. et al., Civil Action No. 2:22-cv-11405-TGB (Jul. 20, 2022).
Neo Wireless LLC, Claim Chart—Claim 13 of U.S. Pat. No. 10,075,941, submitted with Plaintiff's First Amended Complaint, Neo Wireless LLC v. Toyota Motor Corporation, et al., Civil Action No. 2:22-cv-00093-JRG-RSP (Jun. 24, 2022).
Neo Wireless LLC, Claim Chart—Claim 13 of U.S. Pat. No. 10,075,941, submitted with Plaintiff's First Amended Complaint, Neo Wireless LLC v. General Motor Company et al., Civil Action No. 2:22-cv-11407-TGB (Jul. 20, 2022).
Neo Wireless LLC, Claim Chart—Claim 13 of U.S. Pat. No. 10,075,941, submitted with Plaintiff's First Amended Complaint, Neo Wireless LLC v. Tesla Inc., Civil Action No. 2:22-cv-11408-TGB (Jul. 20, 2022).
Neo Wireless LLC, Claim Chart—Claim 13 of U.S. Pat. No. 10,075,941, submitted with Plaintiff's First Amended Complaint, Neo Wireless LLC v. Ford Motor Company, Civil Action No. 2:22-cv-11402-TGB (Jul. 20, 2022).
Neo Wireless LLC, Claim Chart—Claim 13 of U.S. Pat. No. 10,075,941, submitted with Plaintiff's Complaint for Patent Infringement, Neo Wireless, LLC v. Mercedes-Benz USA, LLC, Civil Action No. 3:22-cv-00780 (Jul. 15, 2022).

(56) References Cited

OTHER PUBLICATIONS

Neo Wireless LLC, Claim Chart—Claim 13 of U.S. Pat. No. 10,075,941, submitted with Plaintiff's Complaint for Patent Infringement, Neo Wireless, LLC v. FCA US, LLC, Civil Action No. 3:22-cv-00780 (Jul. 15, 2022).
Neo Wireless, LLC v. American Honda Motor Co., Inc. et al. and Neo Wireless, LLC v. Nissan North America Inc. et al., Plaintiff Neo Wireless, LLC's Response to Defendants Honda and Nissan's Motion to Dismiss Plaintiff's Claims of Willful and Induced Patent Infringement, 2:22-CV-03034-TGB (Sep. 1, 2022).
Neo Wireless, LLC v. American Honda Motor Co., Inc. et al. and Neo Wireless, LLC v. Nissan North America Inc. et al., Plaintiff Neo Wireless, LLC's Response to Defendants Honda and Nissan's Motion to Dismiss Plaintiff's Claims of Willful and Induced Patent Infringement, 2:22-CV-11403-TGB (Aug. 31, 2022).
Neo Wireless, LLC v. American Honda Motor Co., Inc. et al. and Neo Wireless, LLC v. Nissan North America Inc., et al., Defendants Honda and Nissan's Reply Brief in Support of their Motion to Dismiss Plaintiff's Claims of Willful and Induced Patent Infringement, Case No. 2:22-cv-11403-TGB and Case No. 2:22-cv-11405-TGB (Sep. 14, 2022).
Neo Wireless, LLC v. FCA US, LLC, Defendant FCA US LLC's Answer and Defenses to Neo Wireless, LLC's Complaint, Case No. 2:22-cv-11770-TGB (Sep. 12, 2022).
Neo Wireless, LLC v. Ford Motor Company, Ford Motor Company's Answer to First Amended Complaint for Patent Infringement, Affirmative Defenses, and Counterclaims, Case No. 2:22-cv-11402-TGB (Aug. 24, 2022).
Neo Wireless, LLC v. Ford Motor Company, Neo Wireless, LLC's Answer to Ford Motor Company's Counterclaims, Case: 2:22-cv-11402-TGB (Sep. 14, 2022).
Neo Wireless, LLC v. General Motors Company et al., The General Motors Defendants Answer to First Amended Complaint, 2:22-CV-11407-TGB (Aug. 24, 2022).
Neo Wireless, LLC V. Mercedes-Benz USA, LLC, Defendant Mercedes-Benz USA, LLC's Motion to Dismiss under Rule 12(b)(6), Case No. 2:22-CV-11769-TGB (Sep. 12, 2022).
Neo Wireless, LLC V. Mercedes-Benz USA, LLC, Defendant Mercedes-Benz USA's partial Answer to Plaintiff Neo Wireless, LLC's Complaint for Patent Infringement, Case No. 2:22-CV-11769-TGB (Sep. 29, 2022).
Neo Wireless, LLC V. Mercedes-Benz USA, LLC, Plaintiff Neo Wireless, LLC's Response to Defendant Mercedes-Benz USA, LLC's Motion to Dismiss Pursuant to Federal Rule of Civil Procedure 12(B)(6), Case No. 2:22-CV-11769-TGB (Oct. 3, 2022).
Neo Wireless, LLC v. Tesla, Inc., Tesla's Answer to Amended Complaint, 2:22-CV-11408-TGB (Aug. 24, 2022).
Neo Wireless, LLC v. Toyota Motor Corporation et al., Defendants' Answer and Affirmative Defenses to Plaintiff's First Amended Complaint for Patent Infringement, No. 2:22-CV-11406-TGB (Aug. 24, 2022).
Neo Wireless, LLC v. Volkswagen Group of America, Inc. et al., Plaintiff Neo Wireless, LLC's Response to Volkswagen Defendants' Motion to Dismiss Pursuant to Federal Rule of Civil Procedure 12(b)(6), 2:22-CV-11404-TGB (Aug. 31, 2022).
Neo Wireless, LLC v. Volkswagen Group of America, Inc., et al., Volkswagen Defendants' Reply in Support of their Motion to Dismiss Pursuant to Federal Rule of Civil Procedure 12(b)(6), Case No. 2:22-cv-11404 (Sep. 14, 2022).
Reiners et al., "Multicarrier Transmission Technique in Cellular Mobile Communications Systems," Proceedings of the IEEE Vehicular Technology Conference, vol. 3, pp. 1645-1649 (1994).
3$^{rd}$ Generation Partnership Project 2 "3GPP2", "cdma2000 High Rate Packet Data Air Interface Specification," 3GPP2 C.S0024, Version 4.0 (Oct. 25, 2002).
3$^{rd}$ Generation Partnership Project 2 "3GPP2", "cdma2000 High Rate Packet Data Air Interface Specification," 3GPP2 C.S0024, Version 3.0 (Dec. 5, 2001).
3$^{rd}$ Generation Partnership Project 2 "3GPP2", "cdma2000 High Rate Packet Data Air Interface Specification," 3GPP2 C.S0024, Version 2.0 (Oct. 27, 2000).
3$^{rd}$ Generation Partnership Project 2 "3GPP2", "cdma2000 High Rate Packet Data Air Interface Specification," 3GPP2 C.S0024-A, Version 1.0 (Mar. 2004).
802.16.2-2004—IEEE Recommended Practice for Local and Metropolitan Area Networks Coexistence of Fixed Broadband Wireless Access Systems (Mar. 17, 2004).
802.16a-2003—IEEE Standard for Amendment to IEEE Standard for Local and Metropolitan Area Networks—Part 16: Air Interface for Fixed Broadband Wireless Access Systems—Medium Access Control Modifications and Additional Physical Layer Specifications for 2-11 GHz (Apr. 1, 2003).
Baxley et al., "Power Savings Analysis of Peak-to-Average Power Ration Reduction in OFDM," IEEE Transactions on Consumer Electronics, vol. 50, No. 3 (Aug. 2004).
Cable Television Laboratories, Inc., "Data-Over-Cable Service Interface Specifications, DOCSIS 2.0, Radio Frequency Interface Specification," SP-RFIv2.0-I04-030730 (Jul. 30, 2003).
Cable Television Laboratories, Inc., "Data-Over-Cable Service Interface Speficiations, DOCSIS 2.0, Radio Frequency Interface Specification," CM-SP-RFIv2.I07-041210 (Dec. 2004).
Coleri et al., "Channel Estimation Techniques Based on Pilot Arrangement in OFDM," IEEE Transactions on Broadcasting, vol. 48, No. 3 (Sep. 2002).
Dell Inc. et al., v. Neo Wireless LLC, Decision Denying Institution of Inter Partes Review of U.S. Pat. No. 10,075,941, IPR 2021-01468 (Mar. 14, 2022).
Dell Inc. et al., v. Neo Wireless LLC, Declaration of Dr. Ding, Inter Partes Review of U.S. Pat. No. 10,075,941 (Aug. 24, 2021)
Dell Inc. et al., v. Neo Wireless LLC, Petition for Inter Partes Review of U.S. Pat. No. 10,075,941 pursuant to 35 U.S.C. §§ 311-319, 37 C.F.R. § 42 (Sep. 1, 2021).
ETSI TR 101 154 V1.4.1, Digital Video Broadcasting (DVB); Implementation guidelines for the use of MPEG-2 Systems, Video and Audio in satellite, cable and terrestrial broadcasting applications (Jul. 2000).
ETSI TS 101 154 V1.5.1, Digital Video Broadcasting (DVB); Implementation guidelines for the use of Video and Audio Coding in Broadcasting Applications based on the MPEG-2 Transport Stream (May 2004).
Garcia et al., "Efficient Pilot Patterns for Channel Estimation in OFDM Systems Over HF Channels," IEEE VTS 50th Vehicular Technology Conference, Gateway to 21st Century Communications Village, pp. 2193-2197 (1999).
Guo et al., "Reducing Peak-to-Average Power Ratio in OFDM Systems by Adaptive Dynamic Range Companding," 2002 World Wireless Congress, San Francisco, CA (2002).
IEEE 802.11g-2003—IEEE Standard for Information technology—Local and metropolitan area networks—Specific requirements—Part 11: Wireless LAN Medium Access Control (MAC) and Physical Layer (PHY) Specifications: Further Higher Data Rate Extension in the 2.4 GHz Band (Jun. 27, 2003).
International Search Report and Written Opinion, PCT Application No. PCT/US05/03518; Filed Jan. 27, 2005; Applicant: Waitical Solutions Inc. dated May, 23, 2005 8 pages.
International Search Report and Written Opinion; PCT Application No. PCT/US05/04601: Filed Feb. 14, 2005; Applicant: Waitical Solutions Inc: dated Jun. 7, 2005; 9 pages.
International Search Report and Written Opinion; PCT Application No. PCT/US05/01939; Filed Jan. 20, 2005; Applicant: Waitical Solutions Inc. dated Apr. 26, 2005: 7 pages.
Koffman et al., "Broadband Wireless Access Solutions Based on OFDM Access in IEEE 802.16," IEEE Communications Magazine, pp. 96-103 (Apr. 2002).
Matsumoto et al., "OFDM subchannel space-combining transmission diversity for broadband wireless communication systems," ICUPC '98. IEEE 1998 International Conference on Universal Personal Communications. Conference Proceedings (Cat. No. 98TH8384), Florence, Italy, pp. 137-141 vol. 1 (1998).
Neo Wireless LLC v. American Honda Motor Co., Inc. et al., Plaintiff NEO Wireless LLC's Complaint for Patent Infringment,

(56) References Cited

OTHER PUBLICATIONS

United States District Court for the Southern District of Ohio Eastern Division at Columbus, Case No. 2:22-cv-01824-EAS-KAJ (Mar. 29, 2022).
Neo Wireless LLC v. Apple Inc., Apple Inc's Answer to Plaintiff's First Amended Complaint, Civil Action No. 6:21-cv-00026-ADA (Jun. 17, 2021).
Neo Wireless LLC v. Apple Inc., Plaintiff's First Amended Complaint, Civil Action No. 6:21-cv-0026 (Apr. 28, 2021).
Neo Wireless LLC v. Dell Technologies Inc. et al., Declaration of Roger Fulgham in Support of Defendants' Opening Claim Construction, Civil Action No. 6:21-cv-0024 (Oct. 28, 2021).
Neo Wireless LLC v. Dell Technologies Inc. et al., Declaration of James Proctor in Support of Defendants' Opening Claim Construction Brief, Civil Action No. 6:21-cv-0024 (Oct. 27, 2021).
Neo Wireless LLC v. Dell Technologies Inc. et al., Declaration of William Alberth in Support of Neo Wireless's Responsive Claim Construction Brief, Civil Action No. 6:21-cv-0024 (Nov. 18, 2021).
Neo Wireless LLC v. Dell Technologies Inc. et al., Defendant's Answer, Affirmative Defenses, and Counterclaims to Plaintiff's Frst Amended Complaint, Civil Action No. 6:21-cv-0024 (Jun. 18, 2021).
Neo Wireless LLC v. Dell Technologies Inc. et al., Defendant's Opening Claim Construction Brief, Civil Action No. 6:21-cv-0024 (Oct. 28, 2021).
Neo Wireless LLC v. Dell Technologies Inc. et al., Defendants' Reply Claim Construction Brief, Civil Action No. 6:21-cv-0024 (Dec. 2, 2021).
Neo Wireless LLC v. Dell Technologies Inc. et al., Joint Claim Construction Statement, Civil Action No. 6:21-cv-0024 (Dec. 21, 2021).
Neo Wireless LLC v. Dell Technologies Inc. et al., Neo Wireless's Answer to Dell's Counterclaims, Civil Action No. 6:21-cv-0024 (Jul. 9, 2021).
Neo Wireless LLC v. Dell Technologies Inc. et al., Plaintiff Neo Wireless LLC's Claim Construction Sur Reply Brief, Civil Action No. 6:21-cv-0024 (Dec. 16, 2021).
Neo Wireless LLC v. Dell Technologies Inc. et al., Plaintiff Neo Wireless LLC's Responsive Claim Construction Brief, Civil Action No. 6:21-cv-0024 (Nov. 18, 2021).
Neo Wireless LLC v. Dell Technologies Inc. et al., Plaintiff Neo Wireless LLC's Response to Defendants' Supplemental Claim Construction Brief, C.A. No. 1:22-cv-60-DAE (Jun. 8, 2022).
Neo Wireless LLC v. Dell Technologies Inc. et al., Stipulated Constructions, Civil Action No. 6:21-cv-0024 (Oct. 27, 2021).
Neo Wireless LLC v. Dell Technologies Inc. et al., Supplemental Declaration of James Proctor in Support of Defendants' Reply Claim Construction Brief, Civil Action No. 6:21-cv-0024 (Dec. 2, 2021).
Neo Wireless LLC v. Dell Technologies, Inc. et al., Plaintiff's First Amended Complaint, Civil Action No. 6:21-cv-0024 (Apr. 28, 2021).
Neo Wireless LLC v. Ford Motor Company, Plaintiff NEO Wireless LLC's Complaint for Patent Infringement, United States District Court for the Western District of Missouri Western Division, Case No. 4:22-cv-00210-GAF (Mar. 29, 2022).
Neo Wireless LLC v. General Motors Company et al., Plaintiff NEO Wireless LLC's Complaint for Patent Infringment, United States District Court for the Eastern District of Texas Marshall Division, Case No. 2:22-cv-00094 (Mar. 29, 2022).
Neo Wireless LLC v. LG Electronics Inc., Defendant LG's Answer to Plaintiff's First Amended Complaint, Civil Action No. 6:21-cv-00025-ADA (Jun. 17, 2021).
Neo Wireless LLC v. LG Electronics, Inc. et al., Plaintiff's First Amended Complaint, Civil Action No. 6:21-cv-0025 (Apr. 28, 2021).
Neo Wireless LLC v. Nissan North America Inc. et al., Plaintiff NEO Wireless LLC's Complaint for Patent Infringement, United States District Court for the Middle District of Tennessee Nashville Division, Case No. 3:22-cv-00220 (Mar. 29, 2022).
Neo Wireless LLC v. Tesla Inc., Plaintiff NEO Wireless LLC's Complaint for Patent Infringement, United States District Court for the Eastern District of Texas Marshall Division, Case No. 2:22-cv-00095 (Mar. 29, 2022).
Neo Wireless LLC v. Toyota Motor North America, Inc. et al., Plaintiff NEO Wireless LLC's Complaint for Patent Infringement, United States District Court for the Eastern District of Texas Marshall Division, Case No. 2:22-cv-00093 (Mar. 29, 2022).
Neo Wireless LLC v. Volkswagen Group of America, Inc., et al., Plaintiff NEO Wireless LLC's Complaint for Patent Infringement, United States District Court for the Eastern District of Tennessee Chattanooga District, Case No. 1:22-cv-00076 (Mar. 29, 2022).
Neo Wireless LLC, Claim Court—Claim 13 of U.S. Pat. No. 10,075,941, submitted with Plaintiff's First Amended Complaint, Neo Wireless LLC v. Dell, Inc. et al., Civil Action No. 6:21-cv-0024 (Apr. 28, 2021).
Neo Wireless, LLC v. Dell Technologies Inc. et al., Defendants' Supplemental Claim Construction Brief, Civil Action No. 1:22-00060-DAE (May 18, 2022).
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Prasad, "Chapter 6—The Peak Power Problem," in OFDM for Wireless Communications Systems, Artech House (2004).
Qiu et al., "Constant rate adaptive modulation with selection transmit diversity for broadband OFDM systems," 14th IEEE Proceedings on Personal, Indoor and Mobile Radio Communications, 2003. PIMRC 2003., Beijing, China, pp. 722-726 vol. 1, (2003).
Shi et al., "An adaptive antenna selection scheme for transmit diversity in OFDM systems," IEEE 54th Vehicular Technology Conference. VTC Fall 2001. Proceedings (Cat. No. 01CH37211), Atlantic City, NJ, USA, pp. 2168-2172 vol. 4, (2001).
Simeone, et al., "Adaptive pilot pattern for OFDM systems," IEEE Communications Society © 2004 IEEE, 5 paqes.
Teng et al., "Proposal of Grouping Adaptive Modulation Method for Burst-Mode OFDM Transmission System," IEICE Trans. Commun., vol. E86-B, No. 1 (Jan. 2003).
Van Nee et al., OFDM for Wireless Multimedia Communications, Artech House (2000).
You et al., "A Simple Construction of OFDM-CDMA Signals with Low Peak-to-Average Power Ratio," IEEE Transactions on Broadcasting, vol. 49, No. 4 (Dec. 2003).
Saltzberg, "Performance of an Efficient Parallel Data Transmission System," IEEE Transactions on Communication Technology, vol. 15, No. 6, pp. 805-811 (1967).
Tufvesson et al., "Pilot Assisted Channel Estimation for OFDM in Mobile Cellular Systems," IEEE 47th Vehicular Technology Conference, Technology in Motion (May 4-7, 1997).
Volkswagen Group of America, Inc. v. Neo Wireless LLC, Declaration of Sarah Kate Wilson, Ph.D., Case No. IPR2022-01537, U.S. Pat. No. 10,075,941 (Sep. 14, 2022).
Volkswagen Group of America, Inc. v. Neo Wireless LLC, Petition for Inter Partes Review of U.S. Pat. No. 10,075,941, Case IPR2022-01537 (Sep. 15, 2022).
Wahlqvist et al., "A Conceptual Study of OFDM-based Multiple Access Schemes: Part 1: Air Interface Requirements," Telia Research AB, Lulea (1996).
Weinstein et al., "Data Transmission by Frequency-Division Multiplexing Using the Discrete Fourier Transform," IEEE Transactions on Communications Technology, vol. 19, No. 4, pp. 628-634 (1971).
*Dell Inc et al.* v. *Neo Wireless LLC*, Declaration of William P. Alberth Jr., Case IPR2021-01468, U.S. Pat. No. 10,075,941 (Dec. 14, 2021).
*Dell Inc et al.* v. *Neo Wireless LLC*, Patent Owner's Preliminary Response, Case IPR2021-01468, U.S. Pat. No. 10,075,941 (Dec. 15, 2021).
Derryberry et al., "Transmit Diversity in 3G CDMA Systems," Wideband Wireless Access Technologies to Broadband Internet, IEEE Communications Magazine (Apr. 2002).

(56) References Cited

OTHER PUBLICATIONS

In Re Neo Wireless, LLC Patent Litig., Defendants' Proposed Interpretations, U.S. District Court for the Eastern District of Michigan, Southern Division, 2:22-MD-03034-TGB (Dec. 30, 2022).
In Re Neo Wireless, LLC Patent Litig., Joint Claim Construction Statement, U.S. District Court for the Eastern District of Michigan, Southern Division, 2:22-MD-03034-TGB (Jan. 18, 2023).
In Re Neo Wireless, LLC Patent Litig., Neo Wireless, LLC's Answer to Ford Motor Company's Counterclaims, U.S. District Court for the Eastern District of Michigan, Southern Division, 2:22-MD-03034-TGB (Jan. 7, 2023).
In Re Neo Wireless, LLC Patent Litig., Neo Wireless, LLC's Comments on the Defendants' First Technology Tutorial, U.S. District Court for the Eastern District of Michigan, Southern Division, 2:22-MD-03034-TGB (Jan. 30, 2023).
In Re Neo Wireless, LLC Patent Litig., Plaintiff Neo Wireless, LLC's Disclosure of Proposed Interpretations and Evidence of Disputed Claim Terms, U.S. District Court for the Eastern District of Michigan, Southern Division, 2:22-MD-03034-TGB (Dec. 30, 2022).
McGraw-Hill, Definition of "burst," Dictionary of Scientific and Technical Terms, 6th edition, (2002).
*Neo Wireless LLC v. Dell Technologies, Inc et al.*, Defendants Preliminary Invalidity Contentions, Civil Action No. 6:21-CV-00024-ADA, U.S. District Court for the Western District of Texas, Waco Division (Sep. 21, 2021).
Newton, Definition of "burst," Newton's Telecom Dictionary, 16th edition, (2000).
Preliminary Invalidity Claim Chart for U.S. Pat. No. 10,834,706 in view of U.S. Pat. No. 8,320,301 (Walton) (2023).
Preliminary Invalidity Claim Chart for U.S. Pat. No. 11,032,801 in view of U.S. Pat. No. 8,320,301 (Walton) and U.S. Pat. No. 7,027,464 (Nakahara) (2023).
Preliminary Invalidity Claim Chart for U.S. Pat. No. 9,301,296 in view of U.S. Pat. No. 8,320,301 (Walton) and U.S. Pat. No. 7,027,464 (Nakahara) (2023).
*Volkswagen Group of America, Inc., v. Neo Wireless LLC*, Declaration of William P. Alberth Jr., Case IPR2022-01537, U.S. Pat. No. 10,075,941 (Feb. 8, 2023).
*Volkswagen Group of America, Inc., v. Neo Wireless LLC*, Patent Owner's Preliminary Response, Case IPR2022-01537, U.S. Pat. No. 10,075,941 (Feb. 8, 2023).
In Re Neo Wireless, LLC Patent Litig., Plaintiff Neo Wireless, LLC's Opening Claim Construction Brief, U.S. District Court for the Eastern District of Michigan, Southern Division, 2:22-MD-03034-TGB (Feb. 16, 2023).
In Re Neo Wireless, LLC Patent Litig., Declaration of William Alberth in Support of Neo Wireless's Opening Claim Construction Brief, U.S. District Court for the Eastern District of Michigan, Southern Division, 2:22-MD-03034-TGB (Feb. 16, 2023).
*American Honda Motor Co., Inc. v. Neo Wireless LLC*, Petition for Inter Partes Review of U.S. Pat. No. 10,075,941, IPR 2023-00791 (Mar. 30, 2023).
*Ford Motor Company v. Neo Wireless LLC*, Declaration of Todor Cooklev in Support of Petition for Inter Partes Review of U.S. Pat. No. 10,075,941, IPR 2023-00766 (Mar. 24, 2023).
*Ford Motor Company v. Neo Wireless LLC*, Petition for Inter Partes Review of U.S. Pat. No. 10,075,941, IPR 2023-00766 (Mar. 28, 2023).
In Re Neo Wireless, LLC Patent Litig., Declaration of William Alberth in Support of Neo Wireless's Reply Claim Construction Brief, U.S. District Court for the Eastern District of Michigan, Southern Division, 2:22-MD-03034-TGB (Mar. 30, 2023).
In Re Neo Wireless, LLC Patent Litig., Plaintiff Neo Wireless, LLC's Reply Claim Construction Brief, U.S. District Court for the Eastern District of Michigan, Southern Division, 2:22-MD-03034-TGB (Mar. 30, 2023).
*Volkswagen Group of America, Inc. v. Neo Wireless LLC*, Declaration of Leonard J. Cimini, Jr, Ph.D., Case IPR2023-00426, U.S. Pat. No. 8,467,366 (Jan. 17, 2023).

In Re Neo Wireless, LLC Patent Litig., Defendants' Supplemental Invalidity and Unenforceability Contentions, U.S. District Court for the Eastern District of Michigan, Southern Division, 2:22-MD-03034-TGB (May 1, 2023).
In Re Neo Wireless, LLC Patent Litig., Defendants' Preliminary Non-Infringement Contentions, U.S. District Court for the Eastern District of Michigan, Southern Division, 2:22-MD-03034-TGB (May 31, 2023).
In Re Neo Wireless, LLC Patent Litigation, Supplemental Patent Invalidity Claim Chart to IEEE Std. 802.16a-2003, submitted as Exhibit C-01 to Defendants' Supplemental Patent Invalidity and Unenforceability Contentions, 2:22-MD-03034-TGB (May 1, 2023).
In Re Neo Wireless, LLC Patent Litigation, Supplemental Patent Invalidity Claim Chart to U.S. Pat. No. 7,020,110, submitted as Exhibit C-07 to Defendants' Supplemental Patent Invalidity and Unenforceability Contentions, 2:22-MD-03034-TGB (May 1, 2023).
In Re Neo Wireless, LLC Patent Litigation, Supplemental Patent Invalidity Claim Chart to U.S. Pat. No. 7,126,996, submitted as Exhibit C-02 to Defendants' Supplemental Patent Invalidity and Unenforceability Contentions, 2:22-MD-03034-TGB (May 1, 2023).
In Re Neo Wireless, LLC Patent Litigation, Supplemental Patent Invalidity Claim Chart to U.S. Pat. No. 8,934,445, submitted as Exhibit C-04 to Defendants' Supplemental Patent Invalidity and Unenforceability Contentions, 2:22-MD-03034-TGB (May 1, 2023).
In Re Neo Wireless, LLC Patent Litigation, Supplemental Patent Invalidity Claim Chart to U.S. Pat. No. 2003/0125040, submitted as Exhibit C-06 to Defendants' Supplemental Patent Invalidity and Unenforceability Contentions, 2:22-MD-03034-TGB (May 1, 2023).
*General Motors LLC et al. v. Neo Wireless LLC*, Petition for Inter Partes Review of U.S. Pat. No. 10,075,941, IPR 2023-00964 (Jun. 5, 2023).
Unified Patents, Patent Invalidity Claim Chart for U.S. Pat. No. 10,075,941 to U.S. Pat. No. 7,126,996, U.S. Pat. No. 7,522,514, and U.S. Pat. No. 8,032,144, Patroll Winning Submission (May 24, 2023).
*American Honda Motor Co., Inc. v. Neo Wireless LLC*, Patent Owner's Preliminary Response, Case IPR 2023-00791, U.S. Pat. No. 10,075,941 (Jul. 13, 2023).
*American Honda Motor Co., Inc. v. Neo Wireless LLC*, Declaration of William P. Alberth Jr., Case IPR2023-00791, U.S. Pat. No. 10,075,941 (Jul. 10, 2023).
*Ford Motor Company v. Neo Wireless LLC*, Patent Owner's Preliminary Response, Case IPR 2023-00766, U.S. Pat. No. 10,075,941 (Jul. 6, 2023).
In Re Neo Wireless, LLC Patent Litigation, Preliminary Claim Construction, 2:22-MD-03034-TGB (Jun. 20, 2023).
In Re Neo Wireless, LLC Patent Litigation, Plaintiff's Response to Defendants' Supplemental Brief Addressing Claim Terms Impacted by IPR Proceedings, 2:22-MD-03034-TGB (Jun. 19, 2023).
In Re Neo Wireless, LLC Patent Litigation, Defendants' Response to Plaintiff Neo Wireless LLC's Supplemental Claim Construction Brief, 2:22-MD-03034-TGB (Jun. 19, 2023).
In Re Neo Wireless, LLC Patent Litigation, Defendants' Supplemental Brief Addressing Claim Terms Impacted by IPR Proceedings, 2:22-MD-03034-TGB (Jun. 13, 2023).
In Re Neo Wireless, LLC Patent Litigation, Plaintiff Neo Wireless LLC's Supplemental Claim Construction Brief, 2:22-MD-03034-TGB (Jun. 13, 2023).
*Ford Motor Company v. Neo Wireless, LLC*, Decision Granting Institution of Inter Partes Review and Granting Motion for Joinder, IPR 2023-0766, U.S. Pat. No. 10,075,941 (Oct. 2, 2023).
*Volkswagen Group of America, Inc., v. Neo Wireless LLC*, Patent Owner Response, Case IPR2022-01537, U.S. Pat. No. 10,075,941 (Aug. 10, 2023).
*Volkswagen Group of America, Inc., v. Neo Wireless LLC*, Second Declaration of William P. Alberth, Jr., Case IPR2022-01537, U.S. Pat. No. 10,075,941 (Aug. 10, 2023).
*General Motors LLC et al., v. Neo Wireless, LLC*, Decision Granting Institution of Inter Partes Review, and Granting Motion for Joinder, IPR 2023-00964, U.S. Pat. No. 10,075,941 (Nov. 8, 2023).

(56) References Cited

OTHER PUBLICATIONS

*Volkswagen Group of America, Inc., et al.,* v. *Neo Wireless, LLC,* Declaration of Sarah Kate Wilson, Ph.D. in Support of Petitioner's Reply to Patent Owner's Response, IPR 2022-01537, U.S. Pat. No. 10,075,941 (Nov. 9, 2023).

*Volkswagen Group of America, Inc., et al.,* v. *Neo Wireless, LLC,* Petitioner Volkswagen Group of America, Inc.'s Reply to Patent Owner's Response, IPR 2022-01537, U.S. Pat. No. 10,075,941 (Nov. 9, 2023).

In Re Neo Wireless, LLC Patent Litig., Defendants' Responsive Claim Construction Brief, U.S. District Court for the Eastern District of Michigan, Southern Division, 2:22-MD-03034-TGB (Mar. 16, 2023).

In Re Neo Wireless, LLC Patent Litig., Declaration of Dr. Robert Akl, D. Sc., in Support of Defendants' Responsive Claim Construction Brief, U.S. District Court for the Eastern District of Michigan, Southern Division, 2:22-MD-03034-TGB (Mar. 15, 2023).

*Ford Motor Company et al.,* v. *Neo Wireless LLC,* Patent Owner's Sur-Reply, Case IPR 2022-01537, U.S. Pat. No. 10,075,941 (Mar. 1, 2024).

In Re Neo Wireless, LLC Patent Litigation, Patent Invalidity Claim Chart to U.S. Pat. No. 7,126,996, submitted as Exhibit C-02 to Defendants' Second Supplemental Invalidity and Unenforceability Contentions, 2:22-MD-03034-TGB (Dec. 20, 2023).

In Re Neo Wireless, LLC Patent Litigation, Redacted Patent Invalidity Claim Chart to IEEE Std. 802.16a-2003, submitted as Exhibit C-01 to Defendants' Preliminary Invalidity and Unenforceability Contentions, 2:22-MD-03034-TGB (Dec. 20, 2023).

In Re Neo Wireless, LLC Patent Litigation, Patent Invalidity Claim Chart to U.S. Pat. No. 8,934,445, submitted as Exhibit C-04 to Defendants' Second Supplemental Invalidity and Unenforceability Contentions, 2:22-MD-03034-TGB (Dec. 20, 2023).

In Re Neo Wireless, LLC Patent Litigation, Patent Invalidity Claim Chart to U.S. Pat. No. 2003/0125040, submitted as Exhibit C-06 to Defendants' Second Supplemental Invalidity and Unenforceability Contentions, 2:22-MD-03034-TGB (Dec. 20, 2023).

In Re Neo Wireless, LLC Patent Litigation, Memorandum Opinion and Order, 2:22-MD-03034-TGB (Nov. 20, 2023).

In Re Neo Wireless, LLC Patent Litigation, Plaintiff Neo Wireless, LLC's Motion for Reconsideration of the Court's Indefiniteness Determination (Dkt, 198), 2:22-MD-03034-TGB (Nov. 26, 2023).

\* cited by examiner

METHODS AND APPARATUS FOR MULTI-CARRIER COMMUNICATION SYSTEMS WITH ADAPTIVE TRANSMISSION AND FEEDBACK

CROSS-REFERENCE TO RELATED APPLICATIONS

This application is a continuation of U.S. patent application Ser. No. 17/727,389, filed Apr. 22, 2022, which is a continuation of U.S. patent application Ser. No. 17/341,871, filed Jun. 8, 2021, which is a continuation of U.S. patent application Ser. No. 17/094,286, filed Nov. 10, 2020, which issued as U.S. Pat. No. 11,032,801 on Jun. 8, 2021, which is a continuation of U.S. patent application Ser. No. 16/126,896, filed Sep. 10, 2018, which issued as U.S. Pat. No. 10,834,706 on Nov. 10, 2020, which is a continuation of U.S. patent application Ser. No. 15/082,878, filed Mar. 28, 2016, which issued as U.S. Pat. No. 10,075,941 on Sep. 11, 2018, which is a continuation of U.S. patent application Ser. No. 14/539,917, filed Nov. 12, 2014, which issued as U.S. Pat. No. 9,301,296 on Mar. 29, 2016, which is a continuation of U.S. patent application Ser. No. 13/246,677, filed on Sep. 27, 2011, which is a continuation of U.S. patent application Ser. No. 12/755,313, filed on Apr. 6, 2010, which issued as U.S. Pat. No. 8,027,367 on Sep. 27, 2011, which is a continuation of U.S. patent application Ser. No. 10/583,529, filed on May 10, 2007, which issued as U.S. Pat. No. 7,693,032 on Apr. 6, 2010, which is a National Stage Entry of PCT/US2005/004601, filed on Feb. 14, 2005, which claims the benefit of U.S. Provisional Application No. 60/544,521, filed on Feb. 13, 2004, which is/are incorporated by reference as if fully set forth. This application also relates to PCT Application No. PCT/US05/03518 titled "Methods and Apparatus for Overlaying Multi-Carrier and Direct Sequence Spread Spectrum Signals in a Broadband Wireless Communication System," filed Jan. 27, 2005, which claims the benefit of U.S. Provisional Application No. 60/540,032 filed Jan. 29, 2004 and U.S. Provisional Application No. 60/540,586 filed Jan. 30, 2004, the contents of which are incorporated herein by reference.

BACKGROUND

Adaptive modulation and coding (AMC) has been used in wireless systems to improve spectral efficiency in a fading environment where signal quality varies significantly. By adjusting the modulation and coding scheme (MCS) in accordance with the varying signal-to-interference-plus-noise ratio (SINR), reliable communication link can be maintained between communicating devices. For example, in CDMA2000 1×EV-DO system, twelve different modulation/coding schemes are provided. AMC is also used in CDMA2000 1×EV-DV and 3GPP HSDPA systems.

To improve performance, in addition to the MCS, other system functions such as channel estimation, transmission power control (TPC), and subchannel configuration can be adjusted in accordance with the state of the communication channel. For example, channel estimation typically utilizes training symbols or pilot data, which are known to both the transmitter and the receiver. For coherent modulation, the channel information can be extracted at the receiver by comparing the pilots and their corresponding received versions. For non-coherent modulation, the received samples of the pilots are used as reference for the detection of the transmitted data.

Channel estimation is an important part of multi-carrier (MC) communication systems such as Orthogonal Frequency Division Multiplexing (OFDM) systems. In conventional OFDM systems, such as IEEE802.11a, 802.11g, 802.16, or DVB-T system, pilots are transmitted for channel estimation. The pilots are fixed and form part of other functions such as MCS, TPC, and subchannel configuration in some wireless systems.

Fast TPC can compensate for fast fading. In a multi-cell multiple-access system, TPC is also used to reduce intra-cell and inter-cell interference and to conserve battery life for the mobile station by transmitting with only necessary power. TPC is one of many functions in some wireless systems, along with MCS, pilot attributes, subchannel configuration, etc.

The subchannel configuration is normally defined and fixed in an operation, and it is usually not considered an adjustable function of the system to be adapted to the user profile and/or operational environment.

DETAILED DESCRIPTION

Methods and apparatus for adaptive transmission of wireless communication signals are described, where MCS (modulation and coding scheme), coding rates, training pilot patterns, TPC (transmission power control) levels, and subchannel configurations are jointly adjusted to adapt to the channel conditions. This adaptation maximizes the overall system capacity and spectral efficiency without wasting radio resources or compromising error probability performance.

Furthermore, the subchannel composition is designed to be configurable so that it can be adjusted statically or dynamically according to the user profiles or environmental conditions. The methods for obtaining the channel information and for transmitting the control information in the joint adaptation scheme are also described below, such as feedback of channel condition and indexing of the joint scheme, along with methods for reducing the overhead of messaging.

The mentioned multi-carrier system can be of any special format such as OFDM, or Multi-Carrier Code Division Multiple Access (MC-CDMA) and can be applied to downlink, uplink, or both, where the duplexing technique is either Time Division Duplexing (TDD) or Frequency Division Duplexing (FDD).

The apparatus and methods are described with respect to various embodiments and provide specific details for a thorough understanding and enablement. One skilled in the art will understand that the invention may be practiced without such details. In some instances well-known structures and functions are not shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
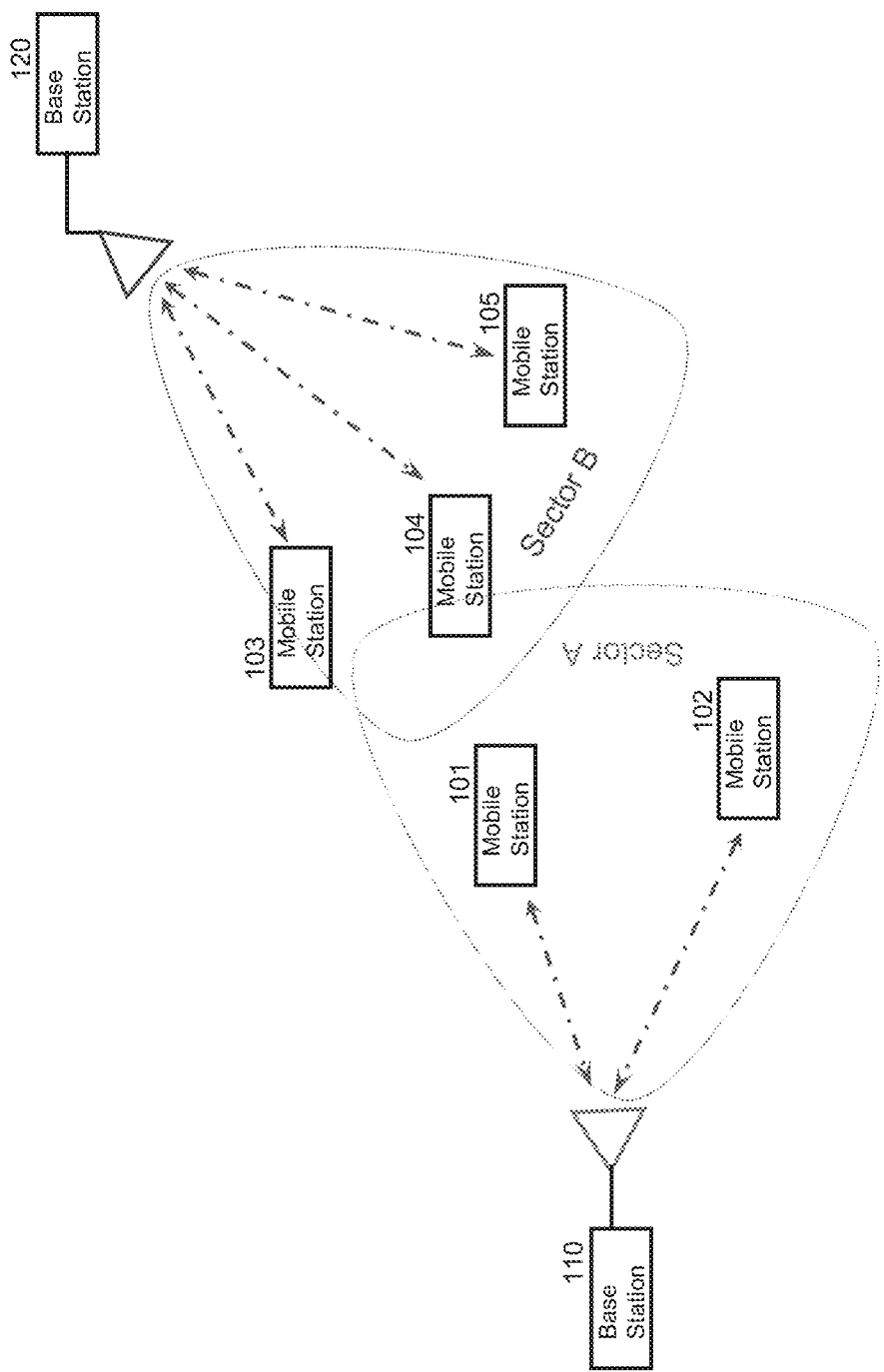
FIG. 1 is a representative cellular communication system.

The content of this description is applicable to a communication system with multiple transmitters and multiple receivers. For example, in a wireless network, there are a number of base stations, each of which provides coverage to its designated area, typically called a cell. Within each cell, there are mobile stations. FIG. 1 illustrates a communication system that is representative of such a system, where Base Station 110 is communicating with Mobile Stations 101 and 102 in Sector A of its cell site while Base Station 120 is communicating with Mobile Stations 103, 104, and 105 in Sector B of its cell site.

A multi-carrier multiple-access system is a special case of general communication systems and hereinafter is employed as a representative communication system to describe the embodiments of the invention.

Multi-Carrier Communication System

The physical media resource (e.g., radio or cable) in a multi-carrier communication system can be divided in both the frequency and the time domains. This canonical division provides a high flexibility and fine granularity for resource sharing.

The basic structure of a multi-carrier signal in the frequency domain is made up of subcarriers. Within a particular spectral band or channel, there are a fixed number of subcarriers, and there are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carrier.

Figure 2:
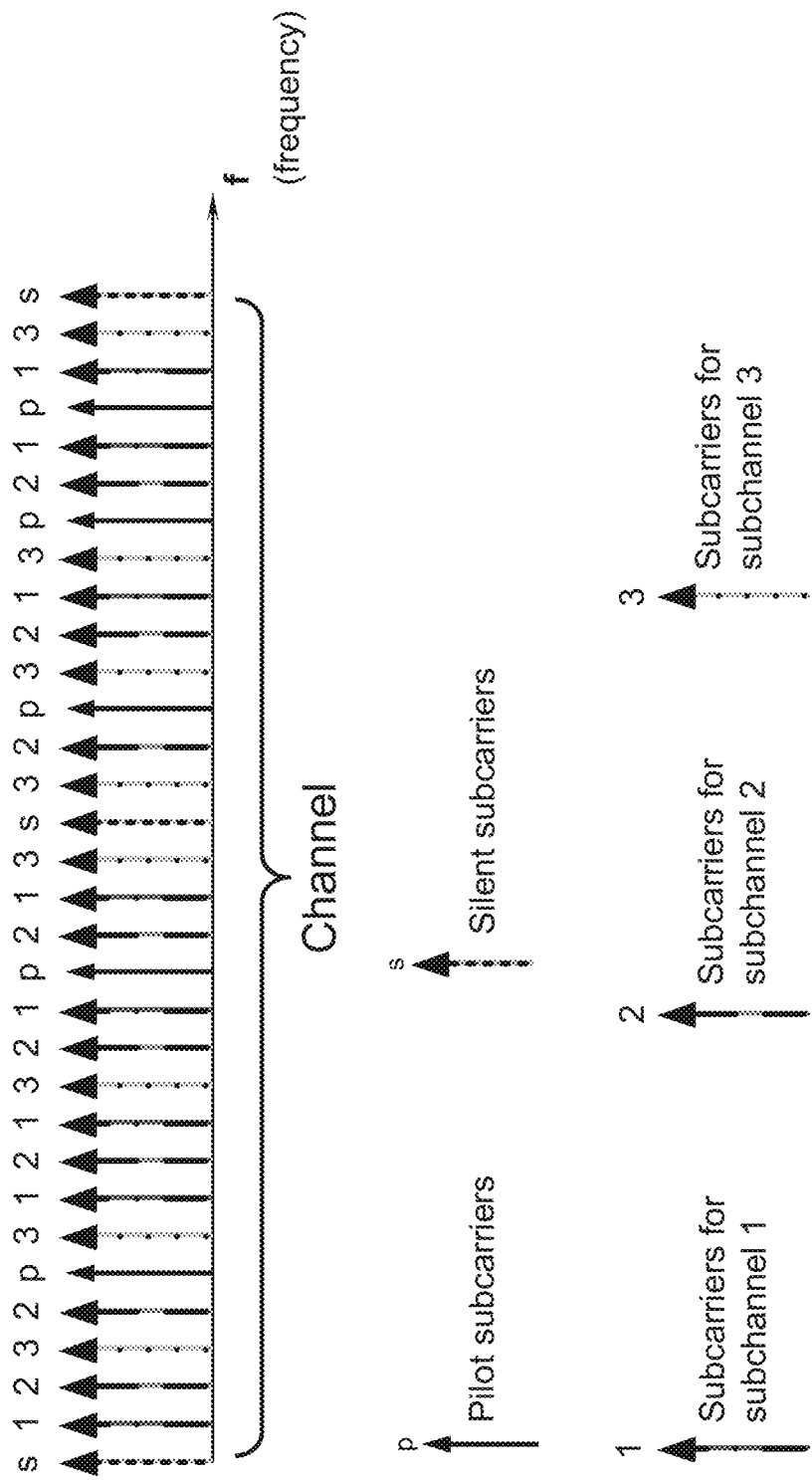
FIG. 2 is a basic structure of a multi-carrier signal in the frequency domain, made up of subcarriers.

The data subcarriers can be arranged into groups called subchannels to support scalability and multiple-access. The carriers forming one subchannel are not necessarily adjacent to each other. Each user may use part or all of the subchannels. The concept is illustrated in FIG. 2, which is the basic structure of a multi-carrier signal in the frequency domain, made up of subcarriers. Data subcarriers can be grouped into subchannels in a specified manner. The pilot subcarriers are also distributed over the entire channel in a specified manner.

Figure 3:
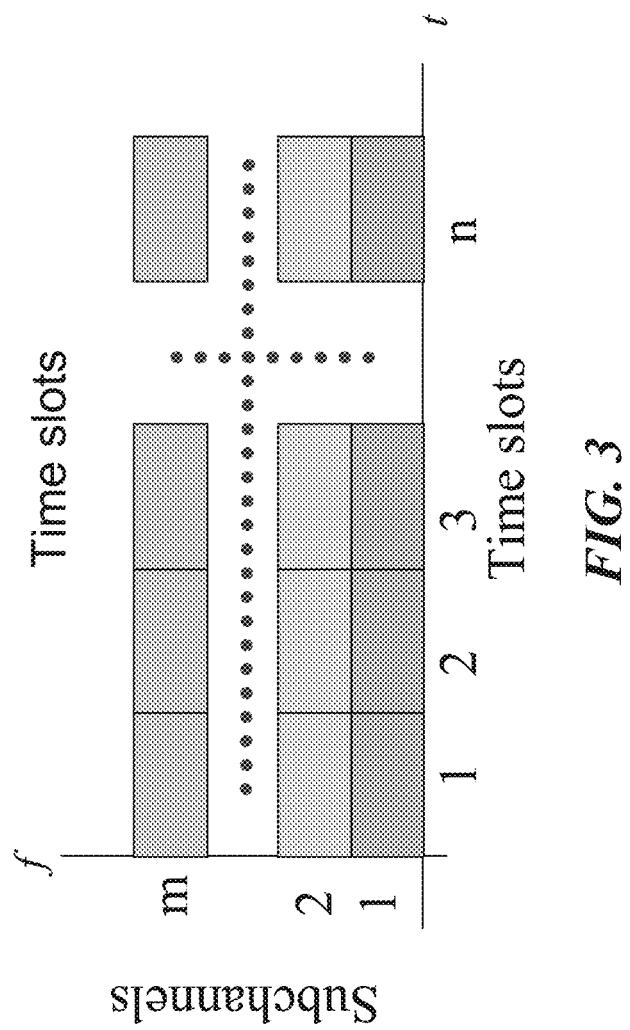
FIG. 3 depicts a radio resource divided into small units in both frequency and time domains: subchannels and time slots.

The basic structure of a multi-carrier signal in the time domain is made up of time slots to support multiple-access. The resource division in both the frequency and time domains is depicted in FIG. 3, which is the radio resource divided into small units in both the frequency and time domains (subchannels and time slots). The basic structure of a multi-carrier signal in the time domain is made up of time slots.

Adaptive Transmission and Feedback

The underlying principles of adaptive transmission and feedback are both to increase the degree of freedom of a transmission process and to supply information for the adaptation process of a communication system. The adaptation process adjusts the allocated modulation schemes, coding rates, pilot patterns, power levels, spatial processing schemes, subchannel configurations, etc. in accordance with the transmission channel state and condition, for improving system performance and/or capacity.

Below, AMCTP (adaptive modulation, coding, training and power control) is used as a general term, where its variations can be applied to appropriate applications. There are different adaptive transmission schemes that are subsets of the AMCTP scheme, such as AMCT (adaptive modulation, coding and training), AMTP (adaptive modulation, training, and power control), AMT (adaptive modulation and training), and so forth.

Figure 4:
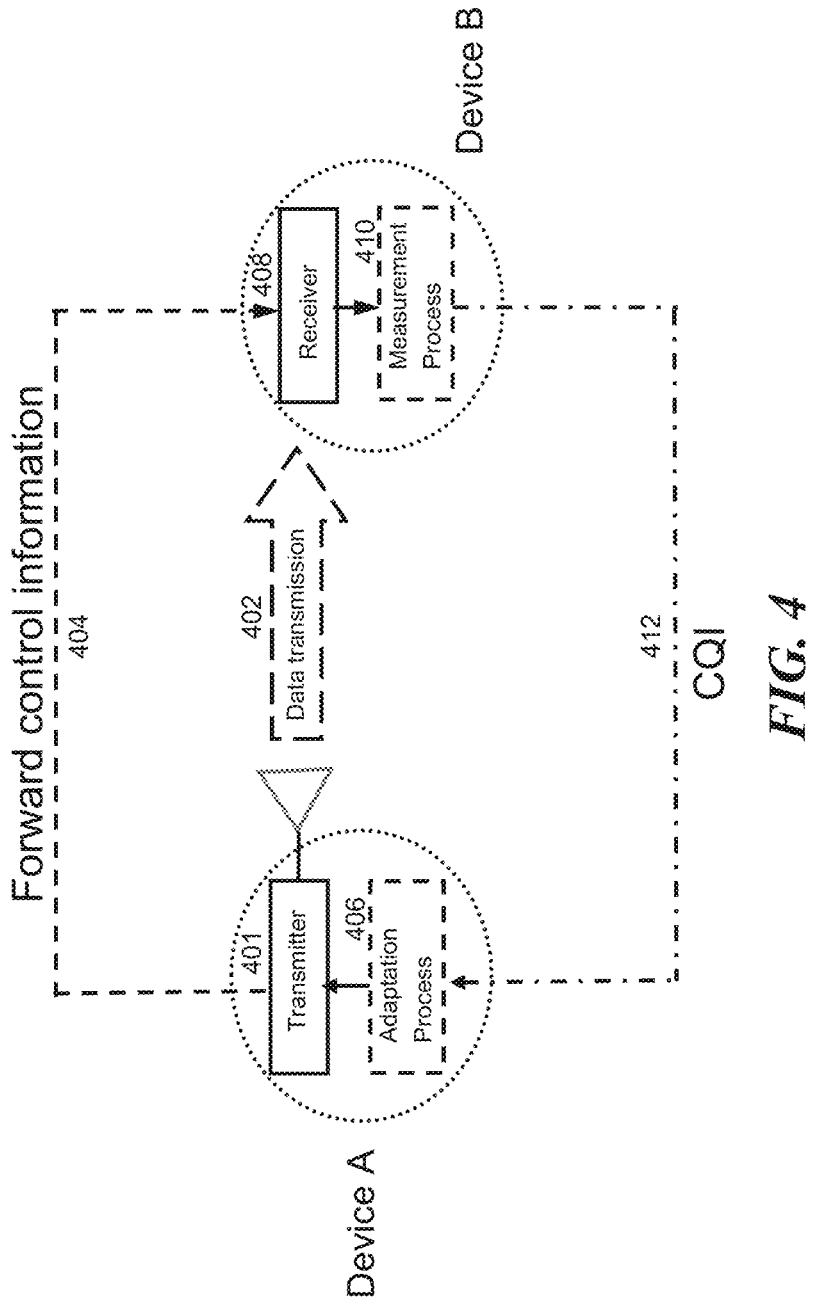
FIG. 4 is an illustration of a control process between Device A and Device B, each of which can be a part of a base station and a mobile station depicted in FIG. 1.

FIG. 4 is an illustration of the control process between Device A and Device B, each of which can be a part of a base station and a mobile station depicted in FIG. 1, during adaptive transmission. The transmitter 401 of Device A transmits data 402 and associated control information 404 to Device B, based on an output of the adaptation process 406. After a receiver 408 of Device B receives the transmitted data 402 and control information 404, a measurement process 410 of Device B measures a channel conditions and feeds a channel quality information (CQI) 412 back to Device A.

The granularity of AMCTP schemes in a multi-carrier system can be user-based, where one or multiple subchannels may be used, or the granularity can be subchannel-based, where a subchannel may contain one or more subcarriers. Likewise, the granularity of CQI can be user- or subchannel-based. Both AMCTP and CQI may change over time and may differ from one time slot to another.

Figure 5:
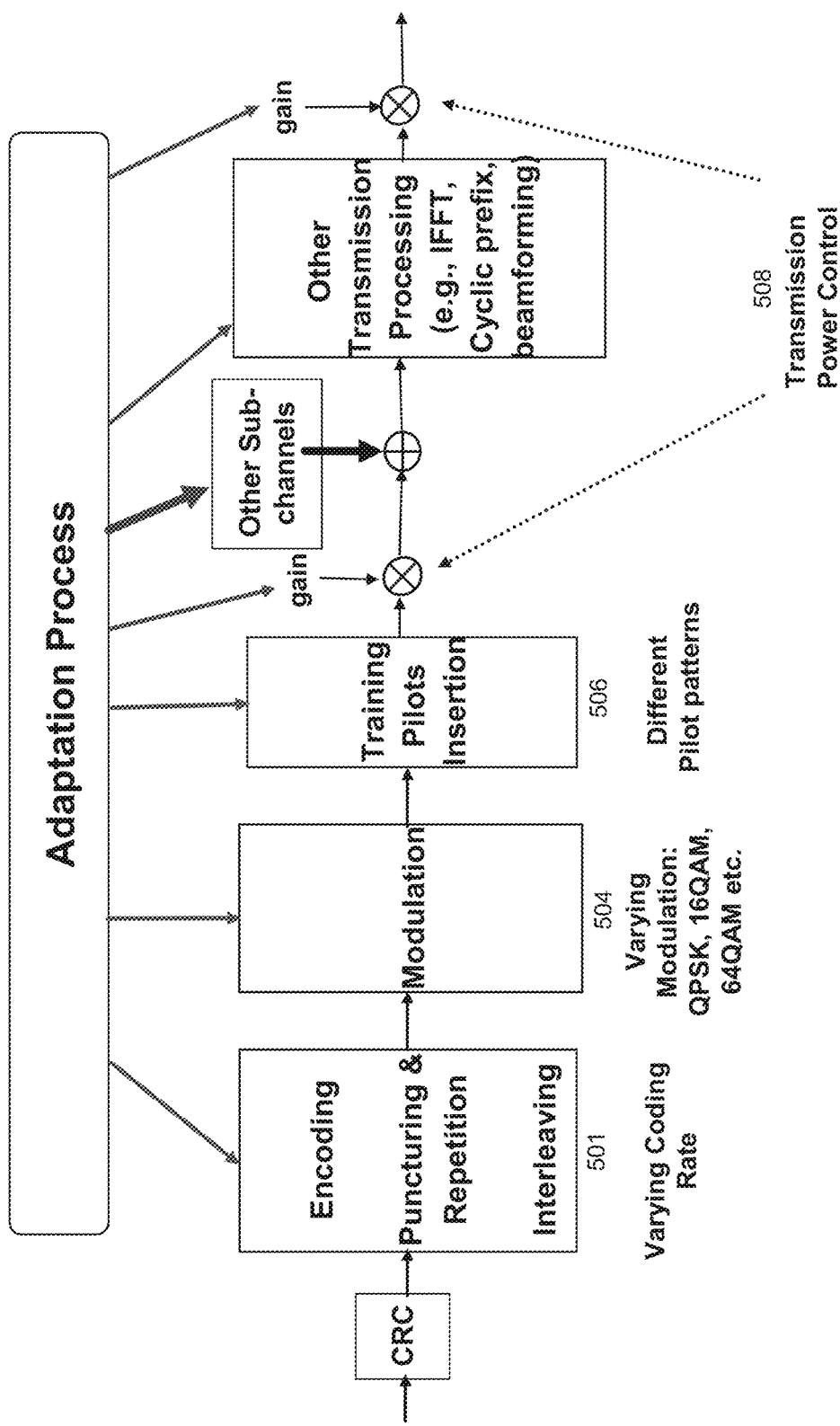
FIG. 5 illustrates a joint adaptation process at a transmitter of an OFDM system which controls coding, modulation, training pilot pattern, and transmission power for a subchannel.

FIG. 5 illustrates a joint adaptation process at a transmitter of an OFDM system which employs separate processing block to control the coding 502, modulation 504, training pilot pattern 506, and transmission power for a subchannel 508. Each block may be implemented combined or separately in circuitry, in dedicated processors, in a digital signal processor, as a microprocessor implemented subroutine, etc.

Figure 6:
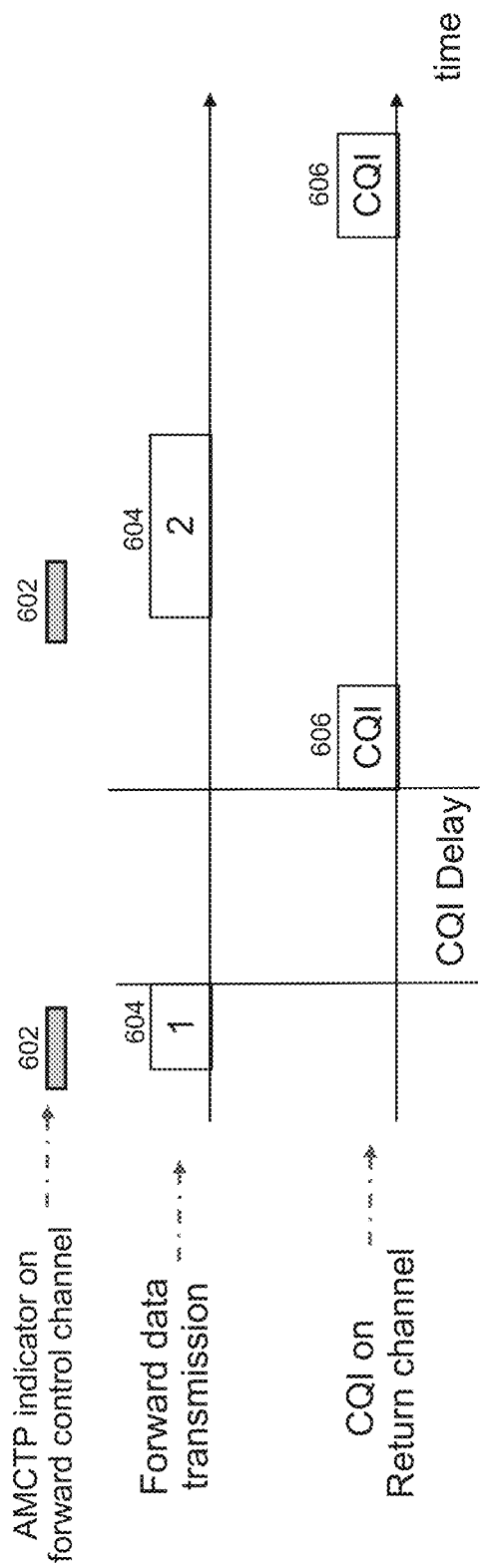
FIG. 6 is an illustration of a control messaging associated with data transmission between communication devices.

FIG. 6 is an illustration of control messaging associated with the data transmission between communication devices, such as Device A and B in FIG. 4. In FIG. 6 the AMCTP indicator 602 is associated with data transmission 604 on a forward link from the transmitter to the receiver, and CQI 606 is associated with the information feedback from the receiver to the transmitter on a return channel.

In a system where AMCTP is used, the transmitter relies on the CQI to select an appropriate AMCTP scheme for transmitting the next packet, or retransmitting a previously failed packet, required in an automatic repeat request (ARQ) process. The CQI is a function of one or more of the following: received signal strength; average SINR; variance in time; frequency or space; measured bit error rate (BER);

frame error rate (FER); or mean square error (MSE). Channel conditions hereinafter are referred to as one or more of the following, for a user or a subchannel: signal level, noise level, interference level, SINR, fading channel characteristics (Dopplerfrequency, delay spread, etc.), or channel profile in time or frequency domain. The detection of the channel condition can be at the transmitter, the receiver, or both.

An MCS in AMCTP is referred to as a modulation and error correction coding scheme used in the system. By matching an MCS to a specific channel condition (e.g., SINR level), a better throughput is achieved. Varying only the MCS is a sub-optimal approach since other factors such as training pilot patterns or subchannel compositions also impact system performance.

A pilot pattern includes the number of (training) pilot symbols, the location of the symbols in time/frequency/space, the amplitude and phase, and other attributes of these symbols. The system may use distinctive pilot patterns to suit different MCS and channel conditions. The pilot pattern requirements for a robust channel estimation vary with the SINR of the channel and the channel profile.

Figure 7:
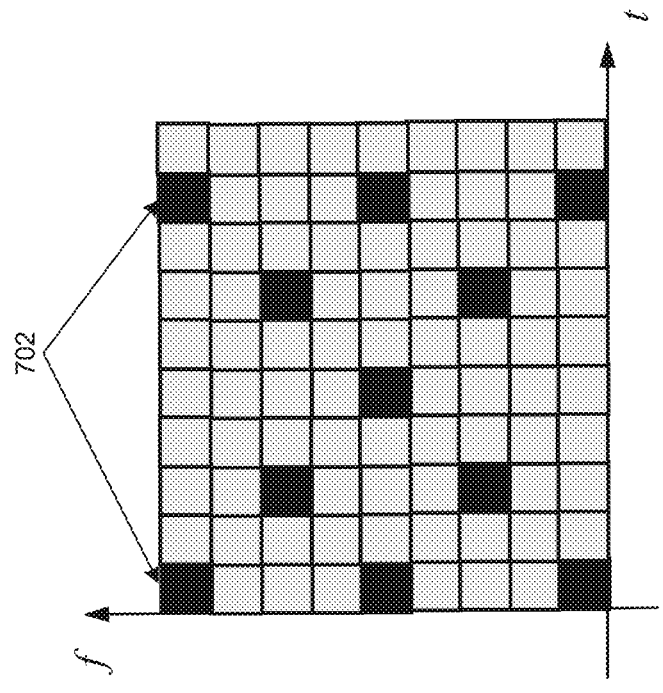
FIG. 7 illustrates two different training pilot patterns plotted for a multi-carrier system.
Figure 7:
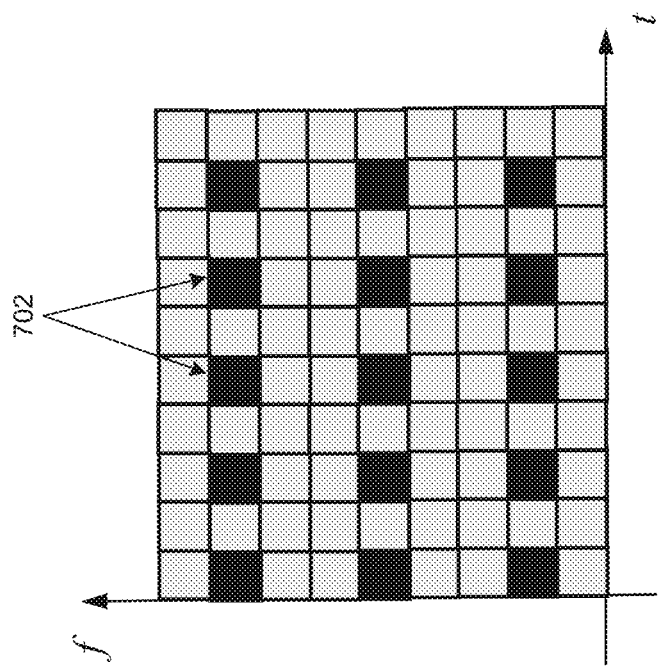

In a multi-carrier system, pilots are transmitted on certain positions in the time-frequency grid. FIG. 7 illustrates two of many different training pilot patterns that may be used, each plotted for a multi-carrier system, where the dark shaded time-frequency grids 702 are allocated as training pilot symbols. One criterion for choosing a pilot pattern is that the pilot assisted channel estimation should not be a bottleneck for the link performance, and that the pilot overhead should be kept to a minimum. The joined adaptation of training pilot pattern together with MCS is a more effective way of matching the channel conditions, and results in a better performance compared with a mere adaptation of MCS.

The power control information may include an absolute power level and/or a relative amount to increase or decrease the current power setting. In a multi-carrier system, the power levels of different subchannels are set differently such that minimum power is allocated to a subchannel to satisfy its performance requirements while minimizing interference to other users.

Figure 8:
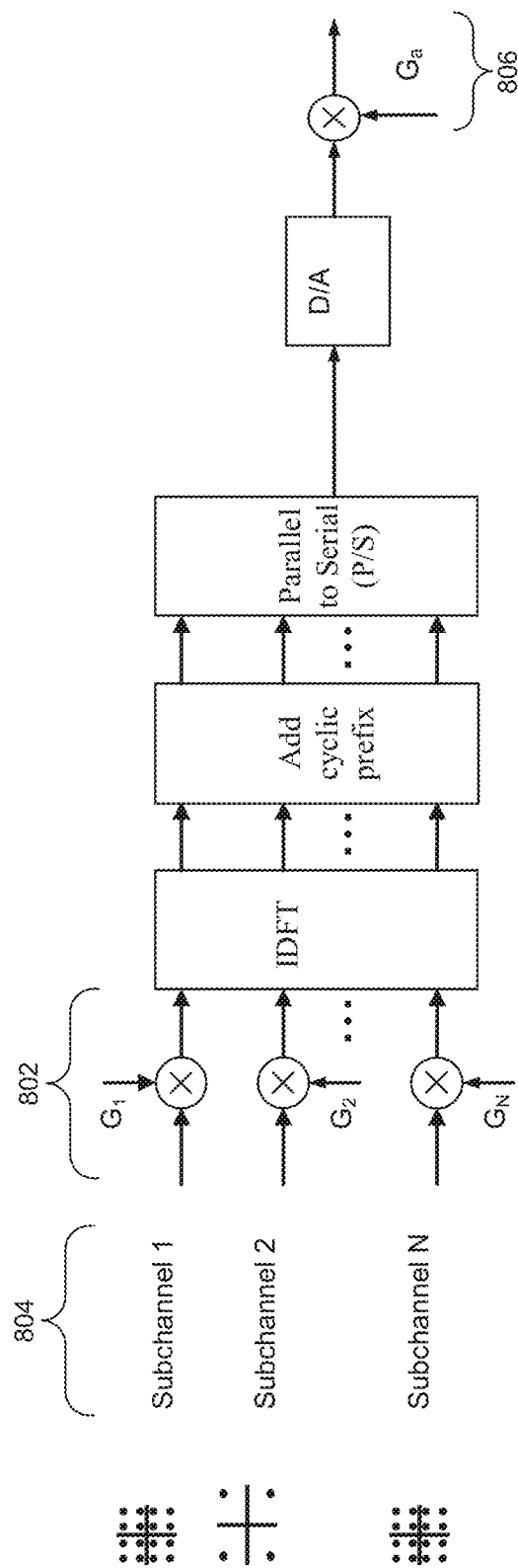
FIG. 8 illustrates a power control in AMCTP scheme for an OFDM system.

The power control can be user- or subchannel-based. FIG. 8 is an illustration of a power control in an OFDM system where digital variable gains 802 G1, G2 . . . GN are applied to subchannels 804 that may have different MCSs with different transmission power levels. Analog domain gain 806 Ga is used to control the total transmission power signal processes to meet the requirements of the transmission power of the device. In FIG. 8, after variable gains are applied to subchannels 804, they are inputted to the inverse discrete Fourier transform (IDFT) module. The outputs from the IDFT are the time domain signals, which are converted from parallel to sequential signals after a cyclic prefix is added to them.

Table 1 is an example of a general AMCTP table (or CQI table). It should be noted that some pilot patterns in the table can be the same. The total number of indexes used to represent different combinations of the joint adaptation process can be different for AMCTP index and CQI index. For instance, it is not necessary to send absolute transmission power information to the receiver(s). Some AMCTP information, such as relative power control or code rate, can be embedded in the data transmission instead of being conveyed in the AMCTP index.

TABLE 1

An example of general AMCTP.

| Index | Modulation | Code Rate | Training Pilot | Transmit Power |
|-------|------------|-----------|----------------|----------------|
| 1 | QPSK | 1/16 | Pattern 1 | + |
| 2 | QPSK | 1/8 | Pattern 2 | + |
| 3 | QPSK | 1/4 | Pattern 3 | + |
| 4 | QPSK | 1/2 | Pattern 4 | + |
| 5 | QPSK | 1/2 | Pattern 5 | + |
| 6 | 16QAM | 1/2 | Pattern 6 | + |
| 7 | 16QAM | 1/2 | Pattern 7 | + |
| 8 | 16QAM | 3/4 | Pattern 8 | + |
| 9 | 16QAM | 3/4 | Pattern 9 | + |
| 10 | 64QAM | 2/3 | Pattern 10 | + |
| 11 | 64QAM | 5/6 | Pattern 11 | + |
| 12 | 64QAM | 5/6 | Pattern 12 | Max-1x |
| 13 | 64QAM | 5/6 | Pattern 13 | Max-2x |
| 14 | 64QAM | 5/6 | Pattern 14 | Max-3x |

In a general AMCTP or CQI table, different training pilot patterns may be used for different modulations and code rates. However, even for the same modulation and coding, different patterns can be used to match different channel conditions. In order to make the table more efficient, more indexes can be allocated to the more frequently used scenarios. For example, several training pilot patterns can be allocated to the same MCS that is used more frequently, to achieve finer granularity and thus have a better match with different channel conditions.

Table 2 is a simple realization of the AMCTP index or the CQI index. In one embodiment, as shown in Table 2, the AMCTP and CQI index is Gray coded so that one bit error in the index makes the index shift to the adjacent index.

In some cases, a different number of pilot symbols is used for the same MCS. In one embodiment, to keep the packet size the same when the same MCS is used with a different number of pilot symbols, rate matching schemes such as repetition or puncturing is employed. For instance in Table 2, for Index 010 and Index 011, Pattern 3 has more pilot symbols compared to Pattern 2. The code rate of Index 010 is 1/2, which is punctured to 7/16 for Index 011 to accommodate the extra pilot symbols. In one embodiment, more significant bits in the CQI index are protected with stronger error protection code on the return channel.

TABLE 2

Another example of AMCTP or CQI table.

| Index (Gray coded) | Modulation | Code Rate | Training Pilot | Transmit Power |
|--------------------|------------|-----------|----------------|----------------|
| 000 | QPSK | 1/4 | Pattern 1 | Max |
| 010 | QPSK | 1/2 | Pattern 2 | Max |
| 011 | QPSK | 7/16 | Pattern 3 | Max |
| 001 | 16QAM | 1/2 | Pattern 2 | Max |
| 101 | 16QAM | 7/16 | Pattern 3 | Max |
| 111 | 64QAM | 2/3 | Pattern 2 | Max |
| 110 | 64QAM | 5/6 | Pattern 3 | Max |
| 100 | 64QAM | 5/6 | Pattern 3 | Max-X |

Other factors that can be used in the adaptation process include modulation constellation arrangements, transmitter antenna techniques, and subchannel configuration in a multi-carrier system.

For some modulation schemes such as 16QAM and 64QAM, how information bits are mapped to a symbol determines the modulation schemes' reliability. In one embodiment, constellation arrangement is adjusted in the adaptation process to achieve a better system performance, especially during retransmission in a hybrid ARQ process.

Some multiple antenna techniques, such as transmission diversity, are used to improve the transmission robustness against fading channel effects, whereas other multiple antenna techniques such as multiple-input multiple-output (MIMO) schemes are used to improve transmission throughput in favorable channel conditions. In one embodiment of the adaptive transmissions the antenna technique used for a transmission is determined by the adaptation process.

In a multi-carrier multi-cell communication system, when all subcarriers in one subchannel are adjacent or close to each other, they are more likely to fall in the coherent bandwidth of a fading channel; thus they can be allocated to users that are either fixed in location or are move slowly. On the other hand, when subcarriers and/or subchannels that belong to one user are scattered in the frequency domain, it results in higher diversity gains for the fast moving users, and a better interference averaging effect.

Given the fact that different configurations of subchannel compositions are suitable for different scenarios or user profiles, subchannel configuration is included in the transmission adaptation process. In one embodiment, the subchannel configuration information is broadcast on the common forward control channel to all users such that each user is informed of its subchannel configuration.

In another embodiment, the subchannel configuration is adjusted according to deployment scenarios. For instance, when a base station is newly deployed with less interference, one form of subchannel configuration is used, and when more users join the network or more adjacent base stations are deployed, which results in stronger interference to the users in the system, a different subchannel configuration with better interference averaging effect is used.

The following paragraphs describe a method of transmitting the control message between the transmitter and receiver, when the AMCTP scheme is implemented. A forward control link is defined here as the transmission of the AMCTP indicator from the transmitter to the receiver, and a return control channel is defined as the transmission of CQI, as the feedback information, from the receiver to the transmitter, as shown in FIG. 4.

The AMCTP indicator on the forward link can be sent either separately or jointly. For instance, the power control information, training pilot pattern indicator, or antenna diversity scheme can be embedded in the data transmission. In another embodiment, AMCTP is transmitted on a separate control channel with stronger error protection.

One way for the transmitter to obtain CQI is to have it explicitly sent from the receiver to the transmitter based on channel condition measurements at the receiver during previous transmission(s). The CQI is then used by the transmitter to determine what AMCTP scheme to use for the next transmission. In one embodiment, CQI for one user is periodically updated on the return channel, even when there is no forward transmission targeted for that user. In this case the receiver measures the channel conditions from the common broadcast transmission or the data transmission targeted to other users.

In one embodiment, the transmitter or the receiver uses any of several known predictive algorithms to predict current or future channel conditions based on previous channel measurements. This is more effective for a fast fading environment where the past measurements may not match the current transmission closely, due to the fast channel variations. The output of the predictive algorithm is then used by the adaptation process to select the best possible scheme for the current transmission.

Another method to obtain CQI is through the transmission of a probing sequence from the receiver to the transmitter on the return channel. In one embodiment, in a multi-carrier communication system, a probing sequence is transmitted from the receiver to the transmitter using an overlay scheme where the probing sequence is overlaid to the data traffic without having negative impact on the data transmission performance. In this case the transmitter estimates the channel profile in the time and/or frequency domains based on the received probing sequence. This is especially effective for TDD systems due to the reciprocity of the channel conditions on forward and reverse channels.

The AMCTP indicator or CQI can be sent per user or per subchannel. In one embodiment if per subchannel feedback is employed, since the AMCTP and CQI information for the same users are highly correlated, first the source coding is employed to compress the CQI, and then the error correction coding is applied to the compressed CQI to provide sufficient error protection.

In another embodiment, in hybrid ARQ retransmission, the transmitter may not use the requested CQI for the retransmission, while it may use the requested CQI for a new packet transmission. Instead, in this embodiment, it selects an AMCTP scheme that is appropriate for the retransmission at the same power level as in the previous transmission(s), in order to reduce interference with other users.

It should be pointed out that the AMCTP index used for the transmission from the transmitter to the receiver may be different from the CQI that the receiver requested, because the transmitter may have other considerations such as quality of service (QoS) for different users, network traffic load, and power allocation limit.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A first device served by a second device using Orthogonal Frequency Division Multiplexing (OFDM) and utilizing OFDM symbols grouped in a time domain into time intervals, each time interval having a plurality of OFDM symbols, and subcarriers grouped in a frequency domain into blocks, each block having a plurality of consecutive subcarriers, the first device comprising:
    a transmitter; and
    a receiver, wherein:
    the receiver is configured to receive a control message on a forward link from the second device, and the control message includes a single value that indicates a modulation scheme of a plurality of modulation schemes and a pilot pattern of a plurality of pilot patterns to use in at least two blocks of the blocks of subcarriers over a time interval; and
    the transmitter is configured to transmit a reverse link signal over the at least two blocks of subcarriers over the plurality of OFDM symbols of the time interval, each block of the at least two blocks has the indicated modulation scheme and contains the indicated pilot pattern, and at least one of the plurality of OFDM symbols of the time interval includes data on some of the plurality of consecutive subcarriers and pilots on others of the plurality of consecutive subcarriers of each block of the at least two blocks.

2. The first device of claim 1 wherein when a first pilot pattern of the plurality of pilot patterns is applied to the at least two blocks of subcarriers, pilots are located at both edge subcarriers in frequency of each block of the at least two blocks of subcarriers and when a second pilot pattern of the plurality of pilot patterns is applied to the at least two blocks of subcarriers, pilots are not located at one of the edge subcarriers in frequency of each block of the at least two blocks of subcarriers.

3. The first device of claim 1 wherein the plurality of modulation schemes include QPSK, 16-QAM and 64-QAM.

4. The first device of claim 1 wherein the indicated pilot pattern is based on channel conditions.

5. The first device of claim 4 wherein the indicated modulation scheme is based on the channel conditions.

6. The first device of claim 1 wherein pilots of each pilot pattern of the plurality of pilot patterns are present in a subset of OFDM symbols in time of the plurality of OFDM symbols in time of the time interval.

7. The first device of claim 1 wherein the receiver is further configured to receive an indication of the at least two blocks in which to transmit the reverse link signal.

8. The first device of claim 1 wherein the receiver is further configured to receive an indication of a duration of the time interval.

9. The first device of claim 1 wherein the time intervals are time slots.

10. The first device of claim 1 wherein the receiver is further configured to receive information that indicates whether the at least two blocks of subcarriers used to transmit the reverse link signal are adjacent in frequency or separated in frequency.

11. The first device of claim 1 wherein the receiver is further configured to receive an indication of a power level to be used by the transmitter for a reverse link transmission.

12. The first device of claim 11 wherein the indication of a power level provides an absolute power level to set the current power level and a relative amount to increase the current power level.

13. The first device of claim 1, wherein the time interval is a first time interval, and further wherein:
    the receiver is further configured to receive a second control message on the forward link from the second device, the second control message includes a single value that indicates a second modulation scheme of the plurality of modulation schemes and a second pilot pattern of the plurality of pilot patterns to use for in multiple blocks of the blocks of subcarriers over a second time interval; and
    the transmitter is further configured to transmit a second reverse link signal over the multiple blocks of subcarriers over the plurality of OFDM symbols of the second time interval, wherein each block of the multiple blocks has the indicated second modulation scheme and contains the indicated second pilot pattern;
    wherein the first pilot pattern and the second pilot pattern respectively specify locations of pilots on a time-frequency grid defined for each block of subcarriers over the plurality of OFDM symbols of the time interval, and wherein the first pilot pattern specifies, on the corresponding time-frequency grid and for a first OFDM symbol of the corresponding time-frequency grid, pilots on more subcarriers than the second pilot pattern specifies, and further wherein the remaining subcarriers for the first OFDM symbol of the corresponding time-frequency grid are used for data, such that more subcarriers of the block for the first OFDM symbol are used for data when using the first pilot pattern than when using the second pilot pattern; and
    wherein the number of subcarriers in each block of the multiple blocks is the same as the number of subcarriers in each block of the at least two blocks and the duration of the first time interval is the same as the duration of the second time interval.

14. The first device of claim 1 wherein for one or more OFDM symbols in time that includes pilots in the indicated pilot pattern, a second pilot pattern of the plurality of pilot patterns includes pilots on a different number of subcarriers than the indicated pilot pattern.

15. The first device of claim 1 wherein the pilot pattern is a first pilot pattern and the reverse link signal is a first reverse link signal, and further wherein:
    in the time interval, at least one block of other blocks of the blocks of subcarriers includes a second reverse link signal that includes a second pilot pattern that is different than the first pilot pattern, and wherein the first pilot pattern and the second pilot pattern are suited for respective channel conditions.

16. A first device serving at least a second device and a third device using Orthogonal Frequency Division Multiplexing (OFDM) and utilizing OFDM symbols grouped in a time domain into time intervals, each time interval having a plurality of OFDM symbols, and subcarriers grouped in a frequency domain into blocks, each block having a plurality of consecutive subcarriers, the first device comprising:
- a transmitter; and
- a receiver, wherein:
  - the transmitter is configured to transmit a control message on a forward link to the second device and to the third device, and the control message includes a single first value that indicates a first modulation scheme of a plurality of modulation schemes and a first pilot pattern of a plurality of pilot patterns for the second device to use in at least two blocks of the blocks of subcarriers over a time interval, and the control message includes a second single value that indicates a second modulation scheme of the plurality of modulation schemes and a second pilot pattern of the plurality of pilot patterns for the third device to use in two or more blocks of subcarriers over the time interval; and
  - the receiver is further configured to:
    - receive a first reverse link signal from the second device over the at least two blocks in over the plurality of OFDM symbols of the time interval, and each block of the at least two blocks has the indicated first modulation scheme and contains the indicated first pilot pattern; and
    - receive a second reverse link signal from the third device over the two or more blocks over the plurality of OFDM symbols of the time interval, and each block of the two or more blocks has the indicated second modulation scheme and contains the indicated second pilot pattern; and
  - at least one of the plurality of OFDM symbols of the time interval includes data on some of the plurality of consecutive subcarriers and pilots on others of the plurality of consecutive subcarriers of each block of the at least two blocks and each block of the two or more blocks.

17. The first device of claim 1 wherein when the first pilot pattern of the plurality of pilot patterns is applied to the at least two blocks of subcarriers, pilots are located at both edge subcarriers in the at least two blocks of subcarriers and when the second pilot pattern of the plurality of pilot patterns is applied to the two or more blocks of subcarriers, pilots are not located at one of the edge subcarriers in the two or more blocks of subcarriers.

18. The first device of claim 16 wherein the plurality of modulation schemes include QPSK, 16-QAM and 64-QAM.

19. The first device of claim 16 wherein the indicated first pilot pattern and the indicated second pilot pattern are based on respective channel conditions.

20. The first device of claim 19 wherein the indicated first modulation scheme and the indicated second modulation scheme are based on the respective channel conditions.

21. The first device of claim 16 wherein pilots of each pilot pattern of the plurality of pilot patterns are present in a subset of OFDM symbols in time of a set the plurality of OFDM symbols in time of the time interval.

22. The first device of claim 16 wherein the transmitter is further configured to transmit an indication of the at least two blocks in which to receive the first reverse link signal and an indication of the two or more blocks in which to receive the second reverse link signal.

23. The first device of claim 16 wherein the transmitter is further configured to transmit an indication of a duration of the time interval.

24. The first device of claim 16 wherein the time intervals are time slots.

25. The first device of claim 16 wherein the transmitter is further configured to transmit information that indicates whether the at least two blocks of subcarriers used to receive the first reverse link signal are adjacent in frequency or separated in frequency.

26. The first device of claim 16 wherein the transmitter is further configured to transmit an indication of a power level to be used by the second device for a reverse link transmission.

27. The first device of claim 26 wherein the indication of a power level provides an absolute power level to set the current power level and a relative amount to increase the current power level.

28. The first device of claim 16, wherein the time interval is a first time interval, and further wherein:
- the transmitter is further configured to transmit a second control message on the forward link to the second device, the second control message includes a single value that indicates a third modulation scheme of the plurality of modulation schemes and a third pilot pattern of the plurality of pilot patterns for the second device to use in multiple blocks of the blocks of subcarriers over a second time interval; and
- the receiver is further configured to receive a third reverse link signal from the second device over the multiple blocks of subcarriers over the plurality of OFDM symbols of the second time interval, wherein each block of the multiple blocks has the indicated third modulation scheme and contains the indicated third pilot pattern;
- wherein the number of subcarriers in each block of the multiple blocks is the same as the number of subcarriers in each block of the at least two blocks and the duration of the first time interval is the same as the duration of the second time interval.

29. The first device of claim 16 wherein for one or more OFDM symbols in time that includes pilots in the first pilot pattern, the second pilot pattern of the plurality of pilot patterns includes pilots on a different number of subcarriers than the first pilot pattern.

30. The first device of claim 16 wherein:
- the first pilot pattern and the second pilot pattern respectively specify locations of pilots on a time-frequency grid defined for each block of subcarriers over the plurality of OFDM symbols of the time interval, and wherein the first pilot pattern specifies, on the corresponding time-frequency grid and for a first OFDM symbol of the corresponding time-frequency grid, pilots on more subcarriers than the second pilot pattern specifies, and further wherein the remaining subcarriers for the first OFDM symbol of the corresponding time-frequency grid are used for data, such that more subcarriers of the block for the first OFDM symbol are used for data when using the first pilot pattern than when using the second pilot pattern; and
- the first pilot pattern and the second pilot pattern are suited for respective channel conditions.

* * * * *